US012726703B2

(12) United States Patent
Hirayama et al.

(10) Patent No.: US 12,726,703 B2
(45) Date of Patent: Sep. 1, 2026

(54) INFORMATION PROCESSING DEVICE AND INFORMATION PROCESSING METHOD FOR IMPROVING IMAGE QUALITY AND SHUTTER LAG OF CONTINUOUSLY CAPTURED IMAGE

(71) Applicant: SONY GROUP CORPORATION, Tokyo (JP)

(72) Inventors: Masatsugu Hirayama, Tokyo (JP); Junichi Nagashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 23 days.

(21) Appl. No.: 18/728,971

(22) PCT Filed: Dec. 21, 2022

(86) PCT No.: PCT/JP2022/047126
§ 371 (c)(1),
(2) Date: Jul. 15, 2024

(87) PCT Pub. No.: WO2023/140027
PCT Pub. Date: Jul. 27, 2023

(65) Prior Publication Data

US 2025/0106509 A1 Mar. 27, 2025

(30) Foreign Application Priority Data

Jan. 24, 2022 (JP) ................................ 2022-008678

(51) Int. Cl.
*H04N 23/68* (2023.01)
*G06T 5/70* (2024.01)
(Continued)

(52) U.S. Cl.
CPC ............ *H04N 23/683* (2023.01); *G06T 5/70* (2024.01); *H04N 23/62* (2023.01); *H04N 23/632* (2023.01); *H04N 23/667* (2023.01)

(58) Field of Classification Search
CPC .. H04N 23/683; H04N 23/667; H04N 23/633; H04N 23/64; H04N 23/631;
(Continued)

(56) References Cited

U.S. PATENT DOCUMENTS 9,324,139 B1 * 4/2016 Linzer .................... H04N 19/58
2007/0064115 A1 3/2007 Nomura
(Continued)

FOREIGN PATENT DOCUMENTS

| | | |
|---|---|---|
| JP | 2012-227791 A | 11/2012 |
| JP | 2014-039169 A | 2/2014 |
| WO | 2007/000900 A1 | 1/2007 |

OTHER PUBLICATIONS

Due Dubois E et al: "Noise Reduction in Image Sequences Using Motion-Compensated Temporal Filtering", IEEE Transactions on Communications, IEEE Service Center, vol. COM-32, No. 7, Jul. 1984, p. 826-831.

(Continued)

*Primary Examiner* — Kelly L Jerabek
(74) *Attorney, Agent, or Firm* — CHIP LAW GROUP

(57) ABSTRACT

Provided is an information processing device that includes a discard image number determination unit that determines, in a case where a motion compensated temporal filtering process is performed on continuously captured images that are images captured by a continuous shooting function of an imaging device, the number of discard images that is the number of images to be discarded among the continuously captured images on which the motion compensated temporal
(Continued)

filtering process was performed in accordance with an imaging setting of the imaging device.

20 Claims, 21 Drawing Sheets

(51) Int. Cl.
*H04N 23/62* (2023.01)
*H04N 23/63* (2023.01)
*H04N 23/667* (2023.01)

(58) Field of Classification Search
CPC ...... H04N 23/60; H04N 23/632; H04N 23/62; G03B 5/00; G03B 3/00; G06T 5/70
See application file for complete search history.

(56) References Cited

U.S. PATENT DOCUMENTS

| | | | | |
|---|---|---|---|---|
| 2009/0251550 | A1 | 10/2009 | Nakamura | |
| 2012/0321211 | A1* | 12/2012 | Tsukagoshi | G06T 7/0002 382/255 |
| 2015/0262341 | A1 | 9/2015 | Nash | |
| 2020/0402218 | A1 | 12/2020 | Okano | |
| 2021/0150735 | A1* | 5/2021 | Elg | G06T 7/262 |

OTHER PUBLICATIONS

International Search Report and Written Opinion of PCT Application No. PCT/JP2022/047126, issued on Mar. 14, 2023, 08 pages of ISRWO.

* cited by examiner

Figure 1:
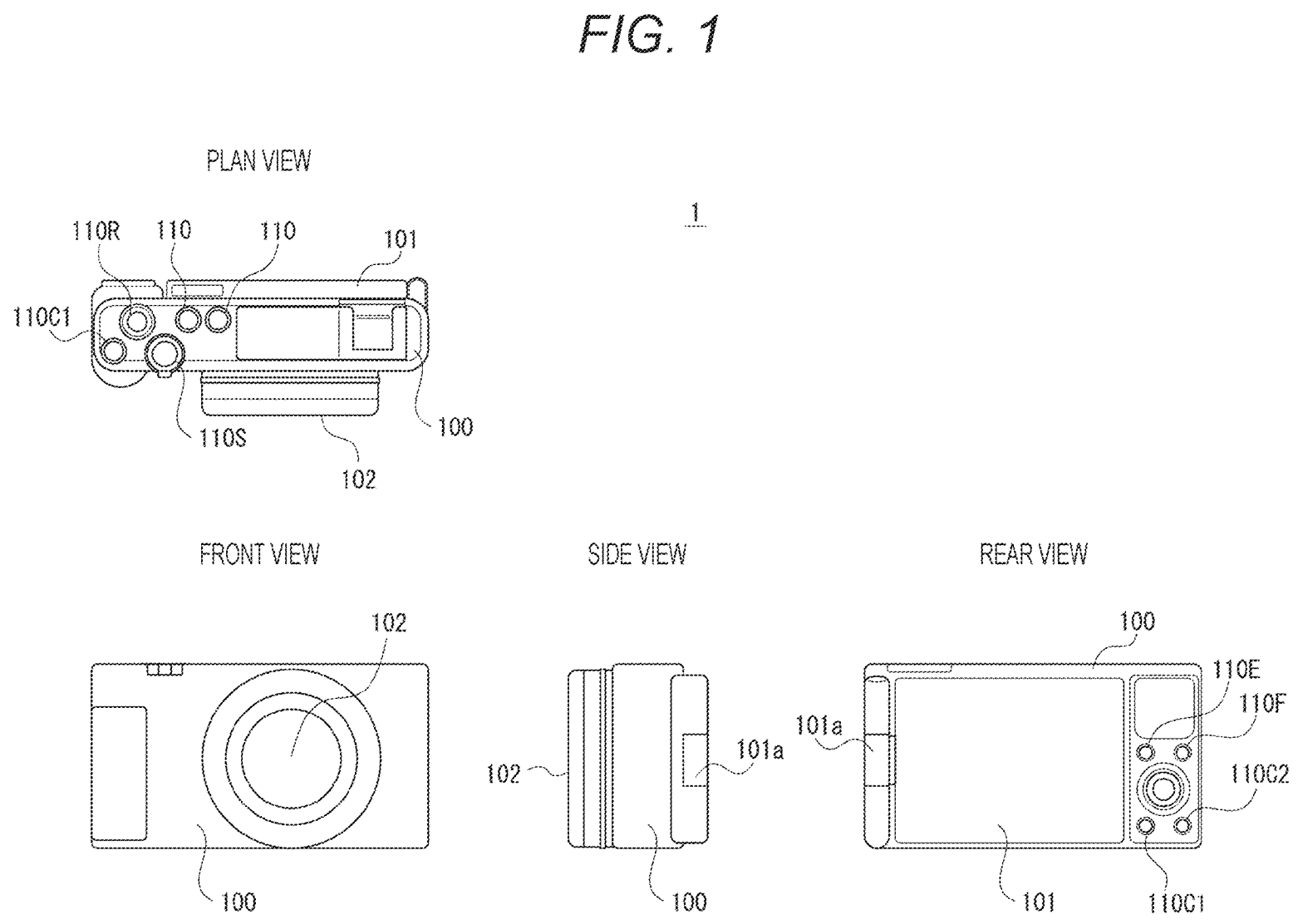

PLAN VIEW 101
100
102
110
110
110S
110R
110C1

FRONT VIEW 102
100

SIDE VIEW 101a
100
102

REAR VIEW 110E
110F
110C2
110C1
100
101
101a

Figure 2:
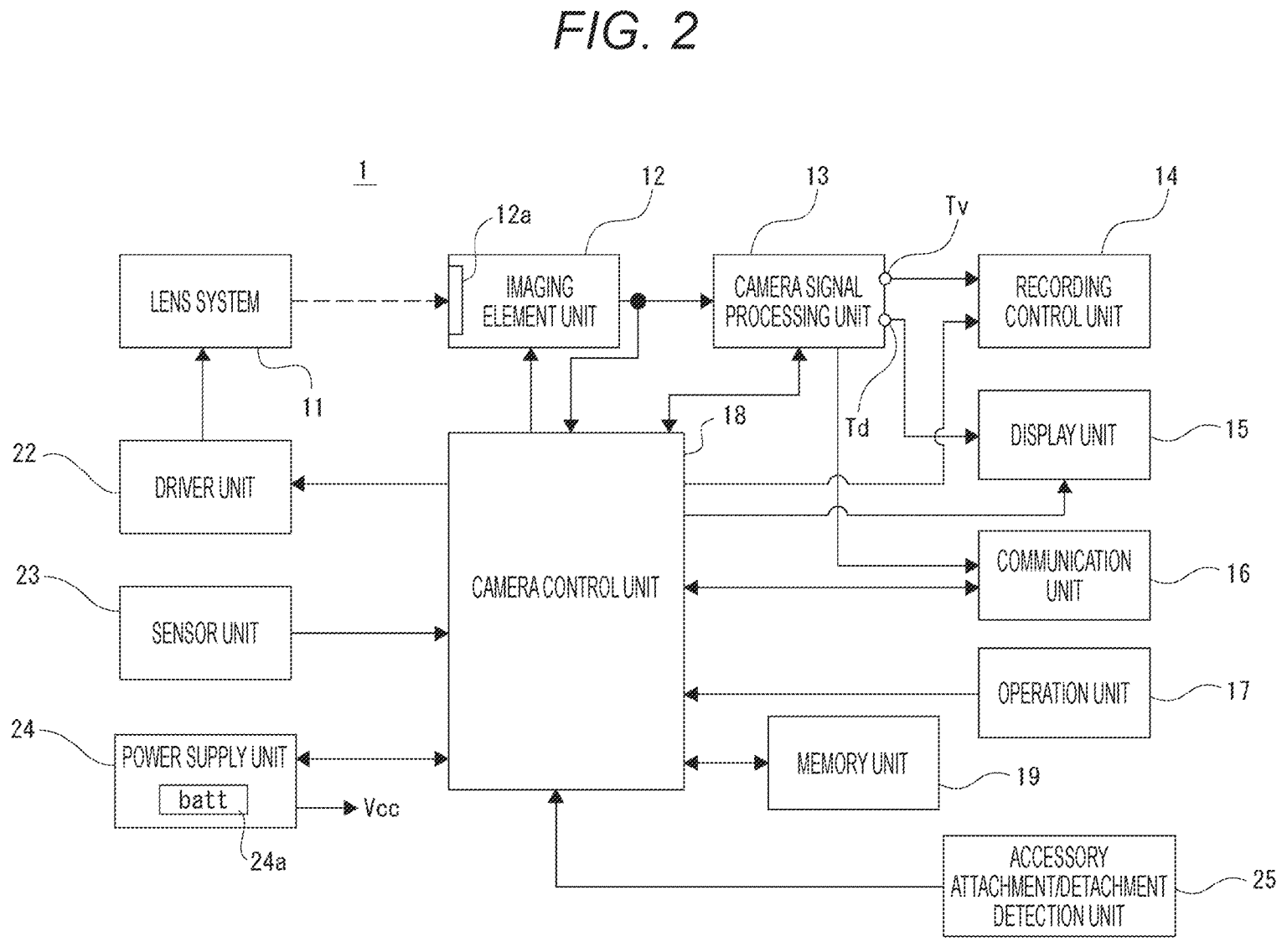

LENS SYSTEM 11
IMAGING ELEMENT UNIT 12
12a
CAMERA SIGNAL PROCESSING UNIT 13
Tv
Td
RECORDING CONTROL UNIT 14
DISPLAY UNIT 15
COMMUNICATION UNIT 16
OPERATION UNIT 17
CAMERA CONTROL UNIT 18
MEMORY UNIT 19
DRIVER UNIT 22
SENSOR UNIT 23
POWER SUPPLY UNIT 24
batt 24a
Vcc
ACCESSORY ATTACHMENT/DETACHMENT DETECTION UNIT 25

FIG. 3

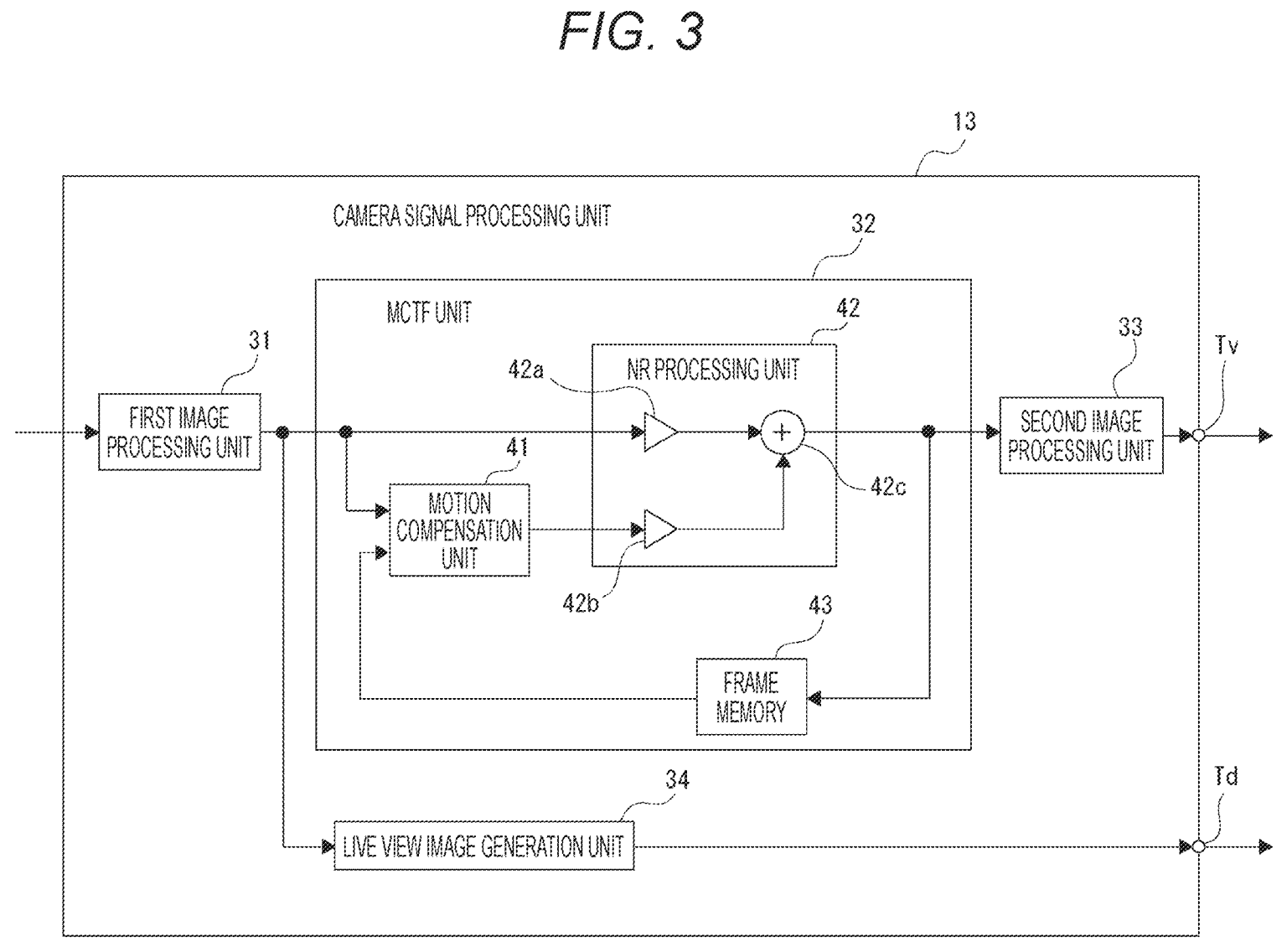

13
CAMERA SIGNAL PROCESSING UNIT
31
FIRST IMAGE PROCESSING UNIT
32
MCTF UNIT
41
MOTION COMPENSATION UNIT
42
NR PROCESSING UNIT
42a
42b
42c
43
FRAME MEMORY
33
SECOND IMAGE PROCESSING UNIT
34
LIVE VIEW IMAGE GENERATION UNIT
Tv
Td

CONTINUOUS SHOOTING START OPERATION
DISCARD

CONTINUOUS SHOOTING START OPERATION
DISCARD

CONTINUOUS SHOOTING START OPERATION
DISCARD

13B
CAMERA SIGNAL PROCESSING UNIT
31
FIRST IMAGE PROCESSING UNIT
t1
t3
SW1
t2
32
42
NR PROCESSING UNIT
41
MOTION COMPENSATION UNIT
43
FRAME MEMORY
35
MFNR UNIT (FIR)
36
FIRST MEMORY
t3
SW2
t1
t2
33
SECOND IMAGE PROCESSING UNIT
Tv
34
LIVE VIEW IMAGE GENERATION UNIT
Td

FIG. 17

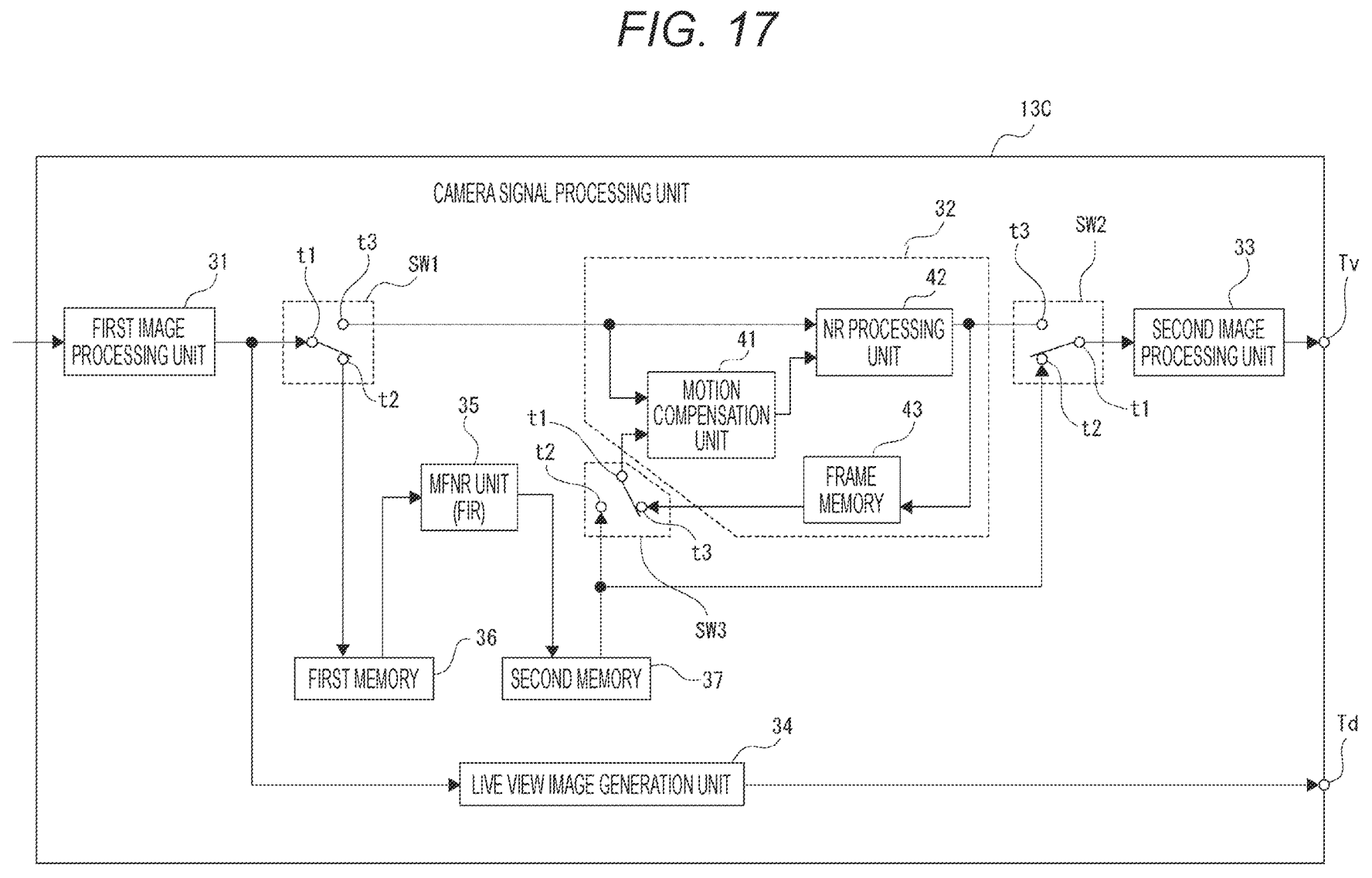

13C
CAMERA SIGNAL PROCESSING UNIT
31 FIRST IMAGE PROCESSING UNIT
SW1 t1 t2 t3
32
41 MOTION COMPENSATION UNIT
42 NR PROCESSING UNIT
43 FRAME MEMORY
SW3 t1 t2 t3
SW2 t1 t2 t3
33 SECOND IMAGE PROCESSING UNIT
35 MFNR UNIT (FIR)
36 FIRST MEMORY
37 SECOND MEMORY
34 LIVE VIEW IMAGE GENERATION UNIT
Tv
Td

FIG. 19

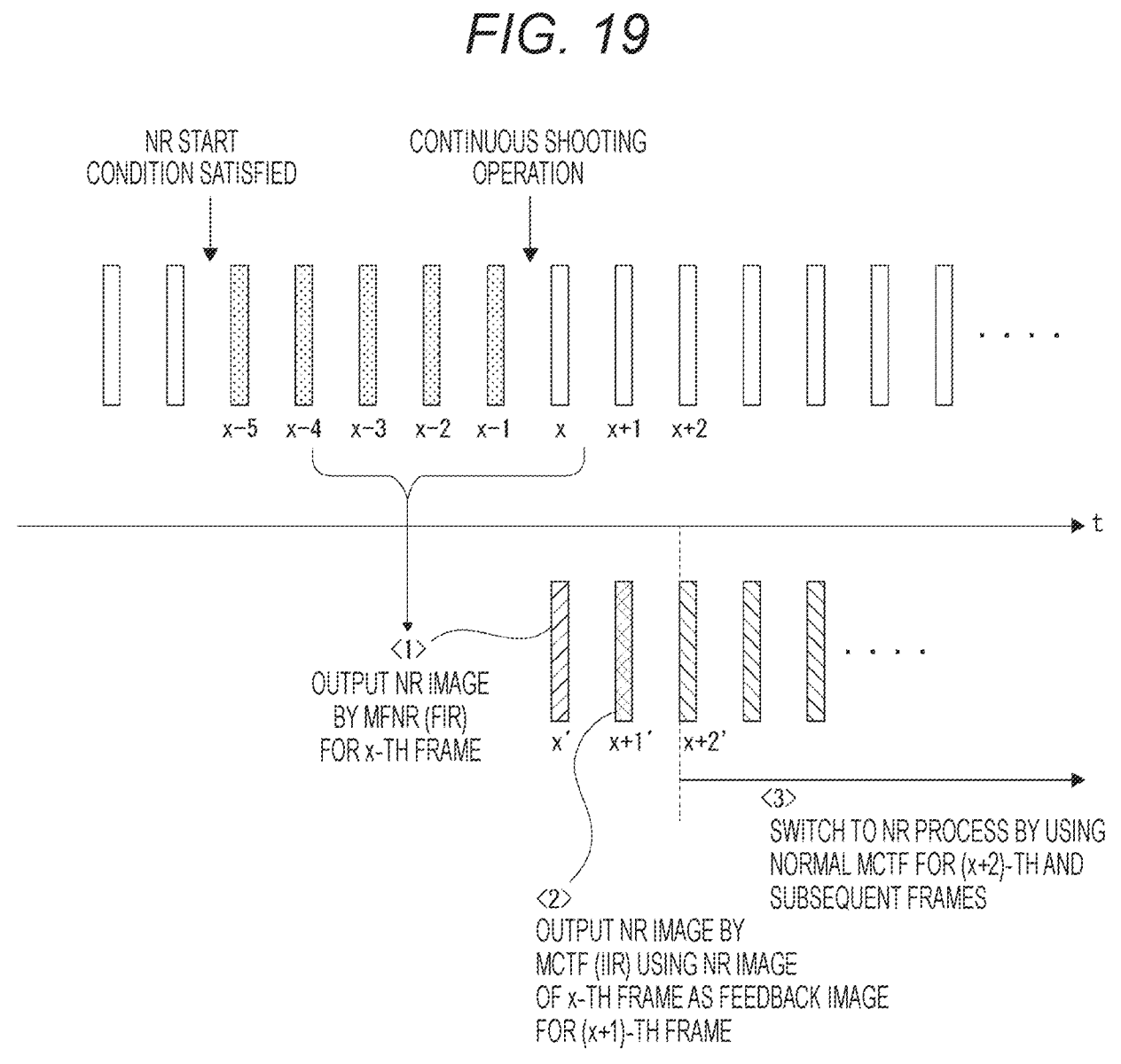

NR START CONDITION SATISFIED

CONTINUOUS SHOOTING OPERATION x−5 x−4 x−3 x−2 x−1 x x+1 x+2 t x' x+1' x+2'

<1> OUTPUT NR IMAGE BY MFNR (FIR) FOR x-TH FRAME

<2> OUTPUT NR IMAGE BY MCTF (IIR) USING NR IMAGE OF x-TH FRAME AS FEEDBACK IMAGE FOR (x+1)-TH FRAME

<3> SWITCH TO NR PROCESS BY USING NORMAL MCTF FOR (x+2)-TH AND SUBSEQUENT FRAMES

FIG. 20

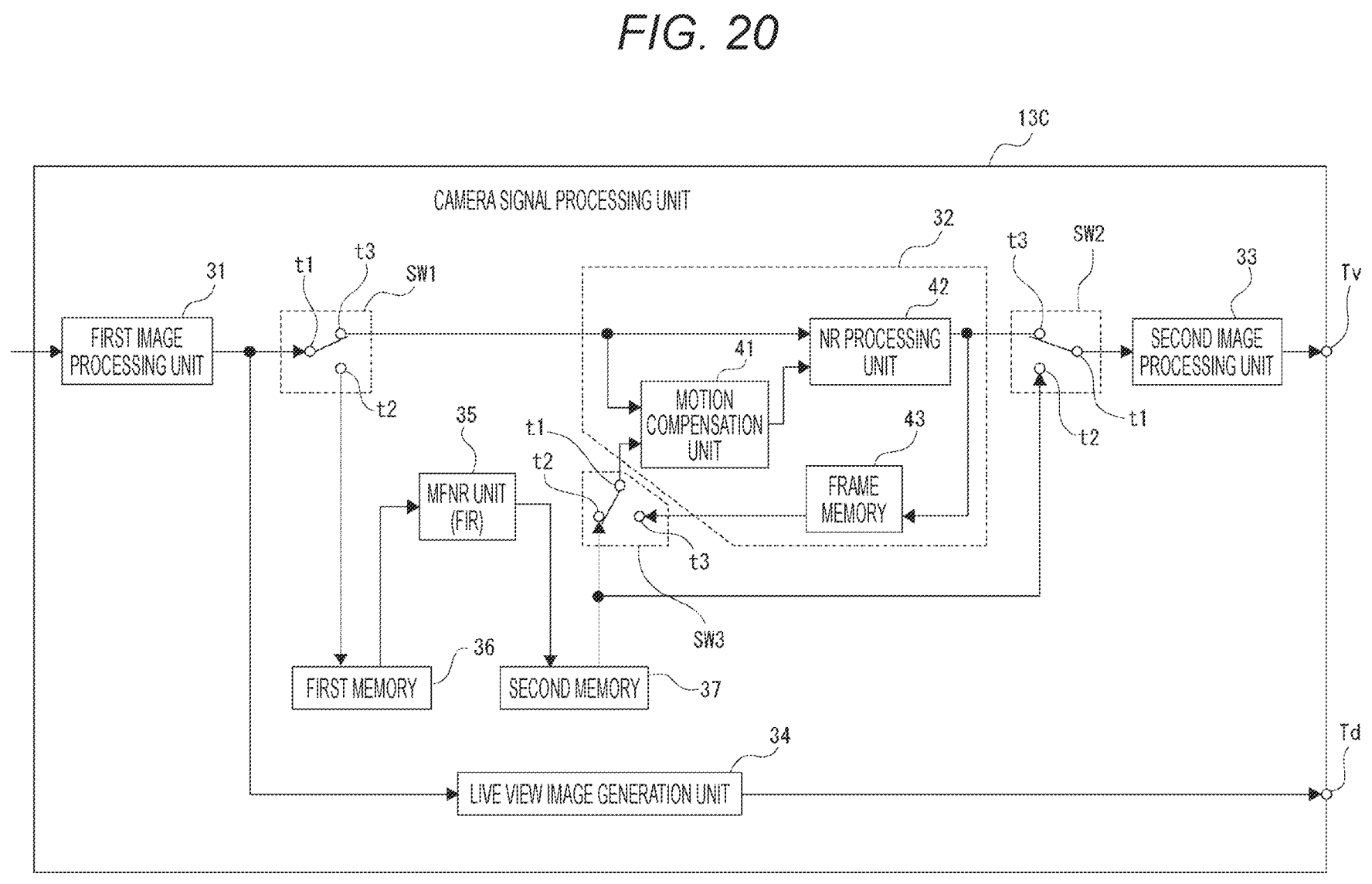

13C
CAMERA SIGNAL PROCESSING UNIT
31
FIRST IMAGE PROCESSING UNIT
SW1
t1
t3
t2
32
41
MOTION COMPENSATION UNIT
42
NR PROCESSING UNIT
43
FRAME MEMORY
SW3
t1
t2
t3
SW2
t3
t1
t2
33
SECOND IMAGE PROCESSING UNIT
Tv
35
MFNR UNIT (FIR)
36
FIRST MEMORY
37
SECOND MEMORY
34
LIVE VIEW IMAGE GENERATION UNIT
Td

13C
CAMERA SIGNAL PROCESSING UNIT
31
FIRST IMAGE PROCESSING UNIT
SW1
t1
t2
t3
FIRST MEMORY
36
MFNR UNIT (FIR)
35
SECOND MEMORY
37
SW3
32
41
MOTION COMPENSATION UNIT
42
NR PROCESSING UNIT
43
FRAME MEMORY
SW2
33
SECOND IMAGE PROCESSING UNIT
34
LIVE VIEW IMAGE GENERATION UNIT
Tv
Td

INFORMATION PROCESSING DEVICE

DISCARD IMAGE NUMBER DETERMINATION UNIT

F1

51

NETWORK

1'

INFORMATION PROCESSING DEVICE AND INFORMATION PROCESSING METHOD FOR IMPROVING IMAGE QUALITY AND SHUTTER LAG OF CONTINUOUSLY CAPTURED IMAGE

CROSS REFERENCE TO RELATED APPLICATIONS

This application is a U.S. National Phase of International Patent Application No. PCT/JP2022/047126 filed on Dec. 21, 2022, which claims priority benefit of Japanese Patent Application No. JP 2022-008678 filed in the Japan Patent Office on Jan. 24, 2022. Each of the above-referenced applications is hereby incorporated herein by reference in its entirety.

TECHNICAL FIELD

The present technology relates to an information processing device, an information processing method, and a program, and particularly relates to a technology for improving image quality and shutter lag of continuously captured images.

BACKGROUND ART

For example, a motion compensated temporal filtering (MCTF) process known as the three-dimensional noise reduction process or the like is known as a process on a captured image by a moving image.

In the MCTF, since the motion of the subject in the captured image frame is compensated between frames, the image correction effect is improved in the noise reduction process or the like on a moving image or the like, for example.

Note that Patent Document 1 below can be cited as a related art.

Patent Document 1 below discloses a technique that achieves high image quality by performing a noise reduction (NR) process on one obtained image in a single shooting mode in a case where the ISO sensitivity is low, and performing an NR process using a plurality of obtained images in a continuous shooting mode in a case where the ISO sensitivity is high (see FIG. 9, to [0085] to [0089], etc.).

CITATION LIST

Patent Document

Patent Document 1: WO 2007/000900 A

SUMMARY OF THE INVENTION

Problems to be Solved by the Invention

Here, in an imaging device having a continuous shooting function, it is considered to perform the MCTF process such as a three-dimensional noise reduction process on captured images (continuously captured images) obtained by continuous shooting in order to improve image quality.

Since the MCTF process is a process using an infinite impulse response (IIR) filter, image input for a plurality of frames is required until the processing effect converges. In other words, a sufficient image quality improvement effect cannot be obtained for images of the first several frames of the continuously captured images.

Therefore, it is conceivable to discard (not record) images for the first several frames of the continuously captured images, but in this case, recording is performed from the captured images several frames after the continuous shooting start timing, thus causing a shutter lag.

In a case where the MCTF process is performed on the continuously captured images in this manner, there is a trade-off relationship between improvement in image quality and shutter lag suppression.

The present technology has been made in view of the above circumstances, and an object of the present technology is to optimize a balance between suppression of a shutter lag in continuous shooting and improvement in image quality of continuously captured images by the motion compensated temporal filtering process.

Solutions to Problems

An information processing device according to the present technology includes a discard image number determination unit configured to determine, in a case where a motion compensated temporal filtering process is performed on continuously captured images that are images captured by a continuous shooting function of an imaging device, the number of discard images that is the number of images to be discarded among the continuously captured images on which the motion compensated temporal filtering process was performed in accordance with an imaging setting of the imaging device.

According to the above configuration, it is possible to adaptively change the number of discard images of the continuously captured images in accordance with the setting related to imaging in the imaging device, such as settings of ISO sensitivity or various imaging modes by the user.

Furthermore, an information processing method according to the present technology is an information processing method including an information processing device determining, in a case where a motion compensated temporal filtering process is performed on continuously captured images that are images captured by a continuous shooting function of an imaging device, the number of discard images that is the number of images to be discarded among the continuously captured images on which the motion compensated temporal filtering process was performed in accordance with an imaging setting of the imaging device.

Such an information processing method can also produce effects similar to the effects produced by the above-described information processing device according to the present technology.

A program according to the present technology is a program readable by a computer device, the program causing the computer device to implement a function of, in a case where a motion compensated temporal filtering process is performed on continuously captured images that are images captured by a continuous shooting function of an imaging device, determining the number of discard images that is the number of images to be discarded among the continuously captured images on which the motion compensated temporal filtering process was performed in accordance with an imaging setting of the imaging device.

With such a program, the information processing device according to the present technology described above is realized.

BRIEF DESCRIPTION OF DRAWINGS

FIG. 1 is a plan view, a front view, a side view, and a rear view of an information processing device according to an embodiment of the present technology.

FIG. 2 is a block diagram illustrating an internal configuration example of the information processing device according to the embodiment.

FIG. 3 is a block diagram illustrating a schematic internal configuration example of a camera signal processing unit included in the information processing device according to the embodiment.

FIG. 17 is a block diagram illustrating a schematic internal configuration example of a camera signal processing unit included in an information processing device as a second example in the second embodiment.

FIG. 19 is an explanatory diagram of an NR process as a second example in the second embodiment.

FIG. 20 is a diagram illustrating a control example of a switch included in an information processing device as a second example in the second embodiment.

FIG. 23 is an explanatory diagram of an information processing device as a modification.

MODE FOR CARRYING OUT THE INVENTION

Figure 4:
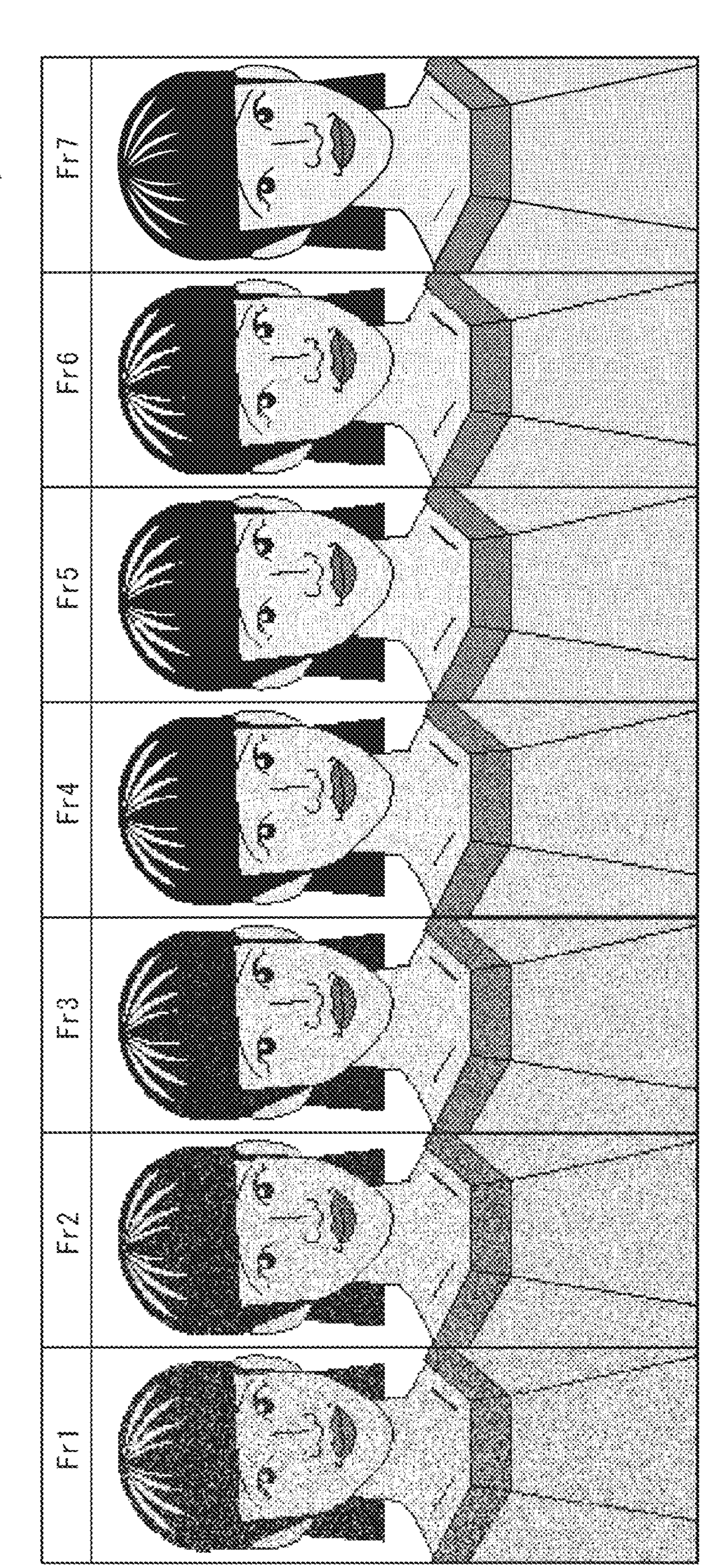
FIG. 4 is a diagram illustrating an image of a state in which the NR effect by an MCTF process converges.

Hereinafter, an embodiment will be described in the following order.

<1. First embodiment>
(1-1. Configuration of imaging device)
(1-2. Shutter lug in continuous imaging)
(1-3. Discard image number adjustment method as embodiment)
(1-4. Processing procedure)
(1-5. Discard image number adjustment method as another example)
(1-6. Another example of notification process)
<2. Second embodiment>
(2-1. First example)
(2-2. Second example)
<3. Modifications>
<4. Program>
<5. Summary of embodiments>
<6. Present technology>

1. First Embodiment

1-1. Configuration of Imaging Device

FIG. 1 illustrates a plan view, a front view, a side view, and a rear view of an imaging device 1 which is an embodiment of an information processing device according to the present technology.

The imaging device 1 is a so-called digital camera, and can execute both still image capturing and moving image capturing.

In the imaging device 1, a lens unit 102 is disposed on the front side of a main body housing 100 constituting the camera body. At the time of imaging, the shutter on the front side is opened, and the lens for imaging is exposed.

On a back side (user side) of the imaging device 1, for example, a display panel 101 including a display device such as a liquid crystal display (LCD) or an organic electro-luminescence (EL) display is provided.

In this example, display panel 101 is held so as to be openable and closable and rotatable by a shaft 101*a*, and is a so-called vari-angle type display panel. In the figure, the display panel 101 shows a state in which the display face is not exposed.

The user can visually recognize an image at the time of imaging, an image at the time of replay, and various types of information by the display panel 101.

Various operators 110 are provided on the main body housing 100 of the imaging device 1.

For example, as the operator 110, various forms such as a key, a dial, and a combined press-rotation operator are provided to achieve various operation functions. For example, a menu operation, a replay operation, a mode selection operation, a focus operation, a zoom operation, a selection operation of parameters such as a shutter speed and an F number, and the like can be performed.

Although detailed description of each operator 110 is avoided, in the case of the present embodiment, several operators 110 including a shutter button 110S and a recording button 110R are disposed on the upper face side of the main body housing 100.

In the present embodiment, the operator 110 includes an auto exposure (AE) lock button 110E and an auto focus (AF) lock button 110F.

The AE lock button 11E is a button for performing an AE lock operation, and the AF lock button 110F is a button for performing an AF lock operation.

Here, the AE lock operation means an operation for giving an instruction to fix the exposure value (the shutter speed value and the aperture value (F number)) to the setting value at the time of the AE lock operation.

In addition, the AF lock operation here means an operation for instructing to fix the focus position at the set position at the time of the AF lock operation.

The user can fix the exposure value and the focus position to desired values and positions by performing the AE lock operation and the AF lock operation after adjusting the exposure value and the focus position to desired positions by a half-pressing operation of the shutter button 110S, for example.

Note that, in FIG. 1, a custom button 110C1, 110C2 is illustrated as one of the operators 110.

The custom button 110C1, 110C2 is an operator also referred to as an assignable button, and is a button to which a predetermined operation function is assigned in an initial state and to which a user can assign an any operation function.

Note that the number of custom buttons is not limited to two, and may be one or three or more.

An internal configuration example of the imaging device 1 will be described with reference to FIG. 2.

The imaging device 1 includes, for example, a lens system 11, an imaging element unit 12, a camera signal processing unit 13, a recording control unit 14, a display unit 15, a communication unit 16, an operation unit 17, a camera control unit 18, a memory unit 19, a driver unit 22, a sensor unit 23, a power supply unit 24, and an accessory attachment/detachment detection unit 25.

The lens system 11 includes lenses such as a zoom lens, and a focus lens, an aperture mechanism, and the like. Light (incident light) from a subject is guided by the lens system 11 and condensed on the imaging element unit 12.

The imaging element unit 12 includes, for example, an image sensor 12*a* (imaging element) of a complementary metal oxide semiconductor (CMOS) type, a charge coupled device (CCD) type, or the like.

The imaging element unit 12 performs, for example, a correlated double sampling (CDS) process, an automatic gain control (AGC) process, and the like on an electric signal obtained by photoelectrically converting light received by the image sensor 12*a*, and further performs an analog/digital (A/D) conversion process. Then, the imaging signal as digital data is output to the camera signal processing unit 13 in the subsequent stage.

In the present example, the imaging element unit 12 is configured to be able to adjust the ISO sensitivity.

The camera signal processing unit 13 is configured as, for example, an image processing processor with a digital signal processor (DSP) or the like. The camera signal processing unit 13 performs various types of signal process on a digital signal (captured image signal) from the imaging element unit 12.

In the present example, the camera signal processing unit 13 performs the process of up to a file forming process on the captured image signal from the imaging element unit 12. In the file forming process, compression encoding, formatting, and generation and addition of metadata for recording and communication are performed to generate a file for recording and communication.

For example, an image file in a format such as joint photographic experts group (JPEG), tagged image file format (TIFF), graphics interchange format (GIF), or the like is generated as a still image file. Furthermore, it is also conceivable to generate an image file as an MP4 format or the like used for recording moving images and audio conforming to MPEG-4 (moving picture experts group (MPEG)).

Furthermore, the camera signal processing unit 13 generates a live view image on the basis of the captured image signal from the imaging element unit 12. The live view image means a captured image to be displayed on a display unit such as the display panel 101 to allow the user to monitor the state of the subject being captured.

The camera signal processing unit 13 outputs the image file generated in the file forming process described above from an output terminal illustrated as a video terminal Tv in the figure, and outputs the live view image from an output terminal illustrated as a display terminal Td in the figure.

Note that an internal configuration example of the camera signal processing unit 13 will be described again with reference to FIG. 3.

The recording control unit 14 performs, for example, recording and replay on a recording medium using a non-volatile memory. The recording control unit 14 performs a process of recording an image such as moving image data or still image data and metadata on a recording medium, for example.

Actual forms of the recording control unit 14 can be diversely considered. For example, the recording control unit 14 may be configured as a flash memory built in the imaging device 1 and a write/read circuit thereof. Furthermore, the recording control unit 14 may be in a form of a card recording/replaying unit configured to perform recording/replaying access to a recording medium detachable from the imaging device 1, for example, a memory card (portable flash memory or the like). Furthermore, the recording control unit 14 may be implemented as a hard disk drive (HDD) or the like as a form built in the imaging device 1.

The display unit 15 is a display unit configured to perform various displays for the imaging person, and is, for example, a display panel 101 or a viewfinder by a display device such as a liquid crystal display (LCD) or an organic electro-luminescence (EL) display disposed in a housing of the imaging device 1.

The display unit 15 displays various images on a display screen on the basis of an instruction from the camera control unit 18.

For example, the display unit 15 displays a replay image of the image data read from the recording medium by the recording control unit 14 on the basis of an instruction from the camera control unit 18.

In addition, the display unit 15 displays an image as the above-described live view image on the basis of an instruction from the camera control unit 18. Furthermore, the display unit 15 displays various operation menus, icons, messages, and the like, that is, an image as a graphical user interface (GUI), on the basis of an instruction from the camera control unit 18.

The communication unit 16 comprehensively indicates various communication devices and communication processing circuits mounted on the imaging device 1.

For the communication by the communication unit 16, various communication circuits and communication devices capable of performing communication via an external communication network (external network communication), local communication with a mobile terminal, and master/slave communication between corresponding devices such as with another imaging device 1 as an aspect of local communication are provided.

As a result, the imaging device 1 transmits and receives captured image data (still image file or moving image file), metadata, various parameters, and the like to and from, for example, an external information processing device, an imaging device, a display device, a recording device, a replay device, and the like.

More specifically, the communication unit 16 includes, as a network communication unit, some or all of a function of performing communication by a mobile communication network such as 4G or 5G, an Internet line, a home network, a local area network (LAN), or the like, a function of performing short distance wireless communication such as Bluetooth (registered trademark), Wi-Fi (registered trademark) communication, or near field communication (NFC), a function of performing infrared communication or the like, a function of performing wired connection communication with another device, and the like.

The operation unit 17 collectively represents input devices for the user to perform various operation inputs. Specifically, the operation unit 17 represents various operators 110, a touch panel, a touch pad, and the like provided in the housing of the imaging device 1.

In the present example, the touch panel is formed on a display screen of the display unit 15 (a display screen of the display panel 101), and can detect a touch position (a position where a touch operation is performed) on the display screen.

An operation of the user is detected by the operation unit 17, and a signal corresponding to the input operation is transmitted to the camera control unit 18.

The camera control unit 18 includes a microcomputer (arithmetic processing device) including a central processing unit (CPU).

The memory unit 19 stores information used for processing by the camera control unit 18. Specifically, the memory unit 19 comprehensively represents, for example, a read only memory (ROM), a random access memory (RAM), a flash memory, and the like.

The memory unit 19 may be a memory area built in a microcomputer chip as the camera control unit 18, or may be configured by a separate memory chip.

The camera control unit 18 controls the entire imaging device 1 by executing a program stored in the ROM, the flash memory, or the like of the memory unit 19.

For example, the camera control unit 18 controls operations of necessary units such as control of a shutter speed of the imaging element unit 12, an instruction of various signal processes in the camera signal processing unit 13, an imaging operation and a recording operation according to a user's operation, a replay operation of a recorded image file, an operation of the lens system 11 such as zooming, focusing, and aperture adjustment in a lens barrel, a user interface operation, and setting of a communication method and a transmission destination by the communication unit 16.

Furthermore, the camera control unit 18 according to the present embodiment executes processing according to various modes selected by the user. The mode mentioned here includes an automatic imaging mode, a program automatic imaging mode, a manual mode, a shutter speed priority mode, an aperture priority mode, and the like.

The program automatic imaging mode mentioned here means an imaging mode in which both the shutter speed and the aperture are automatically set. The automatic imaging mode means an imaging mode having a larger number of automatic setting items than the program automatic imaging mode. That is, it is an imaging mode in which automatic setting is performed for setting items other than the shutter speed and the aperture.

The shutter speed priority mode is a mode that enables selection of a shutter speed by the user and automatically sets an aperture value according to the shutter speed selected by the user, and conversely, the aperture priority mode is a mode that enables selection of an aperture value by the user and automatically sets a shutter speed according to the aperture value selected by the user. The manual mode is a mode for allowing the user to select both the shutter speed and the aperture value.

In addition, the camera control unit 18 performs a process according to switching between the continuous shooting mode and the drive mode as the single shooting mode.

The continuous shooting mode means a mode for continuously recording captured images as continuous shooting in accordance with the release operation, and the single shooting mode means a mode for recording only a captured image at the timing when the release operation is performed.

In this example, the release operation is a full-pressing operation of the shutter button 110S. Here, in the imaging device 1 of the present example, the half-pressing operation and the full-pressing operation can be detected separately for the pressing operation of the shutter button 110S. The half-pressing operation means a pressing operation in which the stroke amount of the shutter button 110S is equal to or larger than a predetermined stroke amount smaller than the maximum stroke amount, and the full-pressing operation means a pressing operation in which the stroke amount of the shutter button 110S is equal to or larger than the predetermined stroke amount and is equal to or larger a stroke amount equal to or smaller than the maximum stroke amount.

In this example, the continuous shooting mode can be switched between a high-speed continuous shooting mode (for example, 20 fps: frame per second) and a low-speed continuous shooting mode (for example, 10 fps). In this example, on the menu screen, it is possible to set whether or not to perform high-speed continuous shooting or low-speed continuous shooting as continuous shooting in the continuous shooting mode.

Note that, regarding the frame rate of the high-speed continuous shooting and the low-speed continuous shooting, it goes without saying that the above numerical values are merely examples for description and are not limited to the illustrated numerical values.

Furthermore, the camera control unit 18 of the present example performs a process for realizing the touch focus function, the touch AE function, the AF lock function, and the AE lock function.

The touch focus function is a function of focusing on a subject appearing at a touched position on the display panel 101 on which a live view image is displayed, and the camera control unit 18 instructs the driver unit 22 as described later to focus on the subject in response to detection of the touch.

In addition, the touch AE function is a function of adjusting exposure so that the brightness of a subject appearing at a touched position on the display panel 101 on which a live view image is displayed is optimized, and the camera control unit 18 controls the shutter speed and the aperture value so that the brightness of the subject is optimized in response to detection of the touch.

The AF lock function means a function of fixing the focus position at the set position at the time of the AF lock operation according to the AF lock operation described above, and the AE lock function means a function of fixing the exposure value to the setting value at the time of the AE lock operation according to the AE lock operation described above.

Furthermore, the camera control unit 18 according to the present embodiment performs a process for discard image number adjustment of continuously captured images at the time of continuous shooting, which will be described later again.

The RAM in the memory unit 19 is used for temporary storage of data, a program, and the like as a work area during various types of data processing of the CPU of the camera control unit 18.

The ROM and the flash memory (nonvolatile memory) in the memory unit 19 are used for storing an operating system (OS) for the CPU to control each unit, content files such as image files, application programs for various operations, firmware, various kinds of setting information, and the like.

Examples of the various types of setting information include communication setting information, an exposure setting (shutter speed or aperture value) as setting information about an imaging operation, a mode setting, a white balance setting as setting information about image processing, a color setting, a setting regarding an image effect, a custom key setting and a display setting as setting information about operability, and the like.

The driver unit 22 is provided with, for example, a motor driver for a zoom lens drive motor, a motor driver for a focus lens drive motor, a motor driver for an aperture mechanism motor, and the like.

In these motor drivers, a drive current is applied to the corresponding driver in response to an instruction from the camera control unit 18 to perform moving the focus lens and zoom lens, opening and closing aperture blades of the aperture mechanism, and the like.

The sensor unit 23 comprehensively indicates various sensors mounted on the imaging device.

For example, an inertial measurement unit (IMU) is mounted as the sensor unit 23. For example, an angular velocity (gyro) sensor of three axes of pitch, yaw, and roll can detect an angular velocity, and an acceleration sensor can detect an acceleration.

As the sensor unit 23, for example, a position information sensor, an illuminance sensor, or the like may be mounted.

Furthermore, it is assumed that a distance measurement sensor is provided as the sensor unit 23. The distance from the imaging device 1 to the subject can be measured by the distance measurement sensor at the time of imaging, and the distance information can be added as metadata to the captured image.

Various types of information detected by the sensor unit 23, for example, position information, distance information, illuminance information, IMU data, and the like can be added as metadata to the captured image together with date and time information managed by the camera control unit 18.

The power supply unit 24 outputs a power supply voltage Vcc necessary for each unit using a battery 24*a* as a power supply. On/off of supply of the power supply voltage Vcc by the power supply unit 24, that is, on/off of the power supply of the imaging device 1 is controlled by the camera control unit 18. Furthermore, the camera control unit 18 can detect the capacity of the battery 24*a*, that is, the remaining battery level.

Note that the power supply unit 24 may be configured to be able to output the power supply voltage Vcc on the basis of an external power supply, for example, by connecting an AC adapter or receiving supply of a DC power supply voltage.

The accessory attachment/detachment detection unit 25 detects attachment/detachment of the camera accessory to/from the imaging device 1. For example, attachment/detachment of a camera accessory such as a strobe, a support of the imaging device 1 such as or a tripod, or an external battery device is detected.

FIG. 3 is a block diagram illustrating a schematic internal configuration example of the camera signal processing unit 13 illustrated in FIG. 1.

As illustrated in the figure, the camera signal processing unit 13 includes a first image processing unit 31, a motion compensated temporal filtering (MCTF) unit 32, a second image processing unit 33, and a live view image generation unit 34.

The first image processing unit 31 performs an image signal process as a front-end unit, such as so-called preprocessing and synchronization processing.

In the preprocessing, the clamp process of clamping black levels of red (R), green (G), and blue (B) to a predetermined level, correction processing between color channels of R, G, and B, and the like are performed on the captured image signal from the imaging element unit 12.

In the synchronization processing, color separation processing is performed so as to cause image data for each pixel to have all the R, G, and B color components. For example, in a case of an imaging element using a Bayer array color filter, demosaicing processing is performed as the color separation processing.

The live view image generation unit 34 generates a live view image by performing a resolution conversion process or the like on the captured image signal on which the image signal process by the first image processing unit 31 is performed.

The live view image generated by the live view image generation unit 34 is output to the display unit 15 via the display terminal Td.

The MCTF unit 32 performs the MCTF process during continuous shooting or moving image capturing. Specifically, a filtering process with motion compensation is performed on captured images continuous in the temporal direction. The motion compensation herein means compensation for positional deviation of the subject between frame images caused by the motion of the subject in the captured image frame.

The MCTF unit 32 in this example performs the three-dimensional noise reduction process as the MCTF process.

As illustrated, the MCTF unit 32 includes a motion compensation unit 41, an NR processing unit 42, and a frame memory 43.

The NR processing unit 42 performs a noise reduction (NR) process with an infinite impulse response (IIR) filter, and includes a multiplication unit 42*a*, a multiplication unit 42*b*, and an addition unit 42*c* as illustrated in the figure.

The captured image (latest frame image) from the first image processing unit 31 is input to the multiplication unit 42*a*.

Furthermore, an output image from the motion compensation unit 41 is input to the multiplication unit 42*b*.

The captured image after the NR process by the NR processing unit 42 is buffered in the frame memory 43.

The motion compensation unit 41 receives a captured image of the previous frame, the captured image being input via the frame memory 43 and a captured image from the first image processing unit 31, and performs motion compensation on the latter captured image, that is, the captured image of the previous frame, on the basis of motion information (motion information between frames) between the two captured images.

In the NR processing unit 42, the multiplication units 42*a* and 42*b* multiply each of the latest frame image from the first image processing unit 31 and the frame image of the previous frame motion-compensated by the motion compensation unit 41 by a predetermined coefficient, and each image multiplied by the predetermined coefficient in this manner is added in the addition unit 42*c*. As a result, noise is suppressed for the latest frame image.

The latest frame image on which the NR process by the NR processing unit 42 is performed as described above is branched into the frame memory 43 and the second image processing unit 33 and output.

The second image processing unit 33 performs a file forming process on the input image.

As described above, in the file forming process, for example, compression encoding, formatting, or the like for recording or communication is performed, and, for example, an image file in a format such as JPEG, TIFF, GIF, or MP4 format is generated.

In the file forming process, metadata may be generated.

The metadata is generated as including information about processing parameters in the camera signal processing unit 13, various control parameters acquired from the camera control unit 18, information indicating a motion state of the lens system 11 or the imaging element unit 12, mode setting information, imaging environment information (date and time, place, and the like), identification information about the imaging device itself, information about a mounting lens, information about a previously registered cameraperson (name and identification information), international press telecommunications council (IPTC) metadata, and the like.

Note that the IPTC metadata is metadata in a format designed by a media company association, and can describe various types of information such as "description/caption", "description writer", "headline", and "keyword". The image file and the metadata obtained by the second image processing unit 33 are output to the recording control unit 14 via the video terminal Tv.

Note that, although not illustrated, in the camera signal processing unit 13, it is also possible to form a path that enables a captured image on which an image process by the first image processing unit 31 is performed to be supplied to the second image processing unit 33 without passing through the MCTF unit 32.

1-2. Shutter Lug in Continuous Imaging

The imaging device 1 of the present embodiment performs the-described three-dimensional noise reduction process by the MCTF unit 32 on the continuously captured images that are images captured by the continuous shooting function in order to improve the image quality.

At this time, since the MCTF process is a process using the IIR filter as described above, image input for a plurality of frames is required until the processing effect converges. In other words, a sufficient image quality improvement effect cannot be obtained for images of the first several frames of the continuously captured images.

FIG. 4 illustrates an image of a state in which the NR effect by the MCTF process converges.

In the figure, the frame number of the frame immediately after the continuous shooting is started is set to "Fr1", and the continuously captured images sequentially obtained thereafter are assigned frame numbers (Fr) in ascending order.

Since the MCTF process is a process using an IIR filter, there is no feedback image in the frame Fr1, and the NR effect cannot be obtained.

In the frame Fr2, since the image of the frame Fr1 can be used as the feedback image, a slight NR effect can be obtained, but the effect is low because the NR effect is not obtained in the frame Fr1.

In the frame Fr3, since the image of the frame Fr2 slightly effective in the NR effect can be used as the feedback image, the NR effect is higher than in the case of the frame Fr2.

As described above, in the three-dimensional noise reduction process by the MCTF using the IIR filter, the NR effect does not converge until a certain number of images are captured after the start of continuous shooting, and continuously captured images have low image quality for several frames after the start of continuous shooting.

Therefore, it is conceivable to discard (not record) images for the first several frames having a low degree of convergence of the NR effect among the continuously captured images.

The discarding of the image mentioned here means that recording is not performed on a recording medium that is outside the signal processing unit (in this example, the camera signal processing unit 13) that performs the motion compensated temporal filtering process and on which the captured image not to be discarded among the continuously captured images is recorded. Specifically, in this example, it means that the recording control unit 14 does not perform recording on the recording medium to be recorded.

Alternatively, the discarding of the image described herein includes a concept including performing recording on the above recording medium (a recording medium that is outside the signal processing unit configured to perform a motion compensated temporal filtering process and on which a captured image not to be discarded is recorded among continuously captured images) but adding identification information indicating that the image is an image to be deleted from the recording medium. For example, by adding identification information such as a flag indicating that the image is to be deleted from the recording medium, it is possible for the user to determine whether or not to delete the image after the image is recorded on the recording medium.

Here, in a case where the first several frames of the continuously captured images are discarded as described above, a lag occurs between the continuous shooting start timing and the imaging timing at which the first continuously captured image to be recorded is captured. This lug is a shutter lug at the time of continuous shooting.

In a case where the MCTF process is performed on the continuously captured images as described above, there is a trade-off relationship between improvement in image quality and shutter lag suppression.

1-3. Discard Image Number Adjustment Method as Embodiment

Therefore, an object of the present embodiment is to optimize the balance between the suppression of the shutter lag in the continuous shooting and the improvement in image quality of the continuously captured images by the MCTF process.

Specifically, the imaging device 1 according to the present embodiment adopts a method of adjusting the number of discard images N that is the number of images to be discarded among the continuously captured images on which the MCTF process is performed in accordance with the imaging setting of the imaging device 1.

Hereinafter, functions of the imaging device 1 as the embodiment including such adjustment of the number of discard images will be described.

Figure 5:
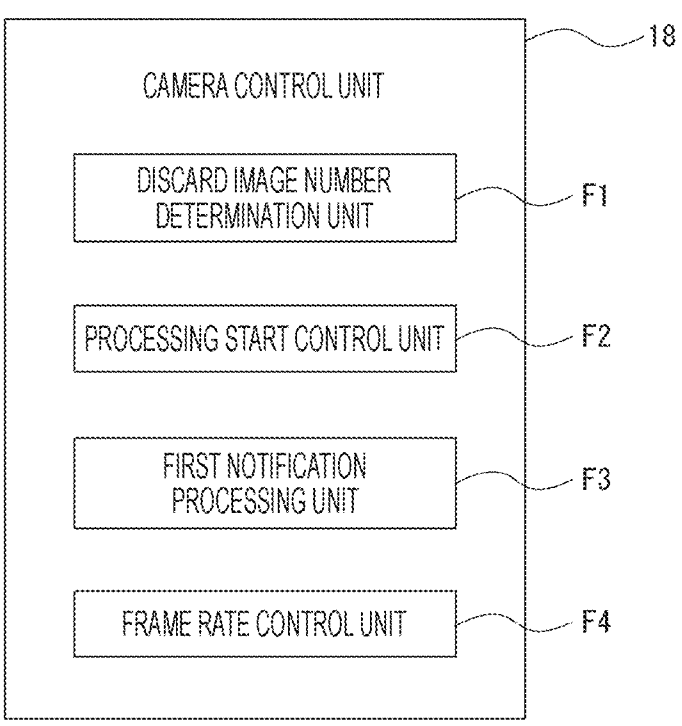
FIG. 5 is a functional block diagram for describing functions of the information processing device as the first embodiment.

FIG. 5 is a functional block diagram illustrating functions of the camera control unit 18 as the embodiment.

As illustrated, the camera control unit 18 has functions as a discard image number determination unit F1, a processing start control unit F2, a first notification processing unit F3, and a frame rate control unit F4.

In a case where the motion compensated temporal filtering (MCTF) process is performed on the continuously captured images, the discard image number determination unit F1 determines the number of discard images N in accordance with the imaging setting of the imaging device 1.

The imaging setting here broadly means various settings related to imaging in the imaging device. For example, examples of the setting can include a setting of ISO sensitivity, a setting of various imaging modes by a user, and the like.

The discard image number determination unit F1 in this example determines the number of discard images N on the basis of the setting of the ISO sensitivity. Specifically, the discard image number determination unit F1 determines the number of discard images N so as to have a positive correlation with the ISO sensitivity. For example, in a case where the ISO sensitivity is 400 or less, the number of discard images N is 3, in a case where the ISO sensitivity is more than 400 and 1600 or less, the number of discard images N is 4, in a case where the ISO sensitivity is more than 1600 and 3200 or less, the number of discard images N is 5, and in a case where the ISO sensitivity is more than 3200, the number of discard images N is 6.

Note that the relationship between the ISO sensitivity and the number of discard images N described above is merely an example for description, and the relationship is not limited thereto.

By determining the number of discard images N as described above, in a case where the ISO sensitivity is high and it is predicted that the degradation of the image quality of the continuously captured images is likely to occur, the number of discard images N is increased to give priority to the image quality, and conversely, in a case where the ISO sensitivity is low and it is predicted that the degradation of the image quality of the continuously captured images is unlikely to occur, the number of discard images N is decreased to give priority to the suppression of the shutter lag.

Therefore, the suppression of the shutter lag in continuous shooting and the improvement in image quality of the continuously captured images by the motion compensated temporal filtering process can be appropriately balanced according to the degree of image quality degradation predicted from the ISO sensitivity.

The processing start control unit F2 performs control of starting the MCTF process in response to satisfaction of a predetermined condition regarding imaging before continuous shooting starts by the continuous shooting function.

Specifically, the processing start control unit F2 starts the MCTF process on condition that an operation related to designation of a focus is performed in the imaging device 1.

More specifically, the processing start control unit F2 starts the MCTF process on condition that the half-pressing operation or the touch focus operation of the shutter button 110S described above is performed.

Note that the touch focus operation is an operation related to the touch focus function described above, and means an operation of touching a subject that the user desires to focus on the display panel 101 (touch screen) on which a live view image is displayed.

In a case where continuous shooting is performed, it is assumed that a half-pressing operation or a touch focus operation of the shutter button 110S is performed before continuous shooting starts.

Therefore, by the processing by the processing start control unit F2 described above, the MCTF process can be started before continuous shooting starts, and at the start of continuous shooting, the image quality improvement effect by the MCTF process can be converged to some extent or completely converged. Therefore, the number of discard images N can be reduced.

Here, the trigger for starting the MCTF process is not limited to the half-pressing operation or the touch focus operation of the shutter button 110S described above.

For example, the motion compensated temporal filtering process may be started on condition that an AF lock operation (autofocus lock operation) has been performed.

The AF lock operation means an operation for instructing to fix the focus position, and corresponds to the operation of the AF lock button 110F described above in the present example.

In a case where continuous shooting is performed, it is assumed that the AF lock operation is also performed before the start of continuous shooting. Therefore, according to the above configuration, the motion MCTF process can be started before continuous shooting starts, and the number of discard images N can be reduced.

In addition, the trigger for starting the MCTF process is not limited to the operation related to designation of the focus.

For example, the MCTF process can be started on condition that the operation related to designation of the exposure is performed. Specifically, it is conceivable to start the MCTF process on condition that the touch AE operation or the AE lock operation has been performed.

Note that the touch AE operation is an operation related to the above-described touch AE function, and means an operation in which the user touches a subject whose brightness is desired to be optimized on the display panel 101 on which a live view image is displayed. In addition, the AE lock operation means an operation for instructing fixing of the exposure value (shutter speed and aperture value) obtained by the AE function, and corresponds to the operation of the AE lock button 110E described above in the present example.

It is assumed that an operation related to exposure designation such as the touch AE operation or the AE lock operation is performed before continuous shooting starts.

Therefore, according to the above configuration, the MCTF process can be started before continuous shooting starts, and the number of discard images N can be reduced.

In addition, the trigger for starting the MCTF process is not limited to the operation related to designation of focus and exposure.

For example, the MCTF process can be started on condition that the imaging device 1 is mounted on the support. Whether or not the imaging device 1 is mounted on a support such as a tripod can be determined on the basis of the detection signal of the accessory attachment/detachment detection unit 25 described above.

In a case where continuous shooting is performed, for example, it is assumed that the imaging device 1 is mounted on a support such as a tripod before continuous shooting is started.

Therefore, according to the above configuration, the MCTF process can be started before continuous shooting starts, and the number of discard images N can be reduced.

Furthermore, in a case where continuous shooting is performed in a state where the imaging device 1 is fixedly supported by the support, the image quality improvement effect by the MCTF process can be easily obtained. In this respect, it is preferable to start the MCTF process according to the attachment to the support as described above.

After the MCTF process is started under the control of the processing start control unit F2, the first notification processing unit F3 performs control to notify the user of the timing at which the number of processed frames M matches the number of discard images N, on the basis of the number of processed frames M that is the number of captured images on which the MCTF process is performed, and the number of discard images N determined by the discard image number determination unit F1.

Figure 6:
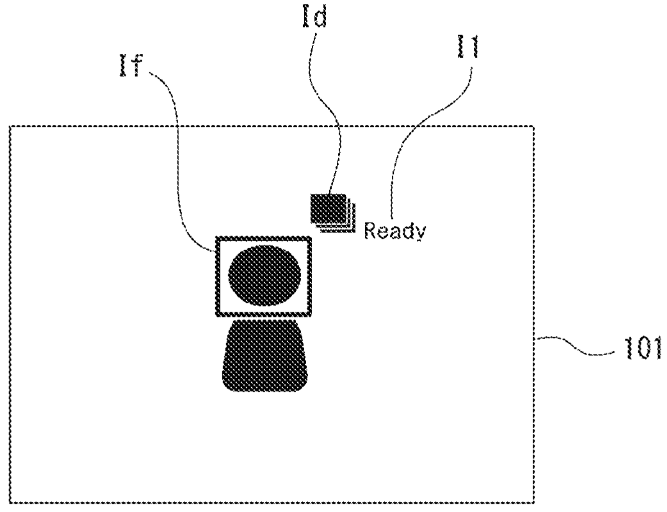
FIG. 6 is a diagram illustrating an example of notification information displayed by a first notification processing unit.

FIG. 6 illustrates an example of the notification information displayed by the first notification processing unit F3.

Here, the display information about the display panel 101 before the start of continuous shooting in the continuous shooting mode is illustrated. As illustrated in the figure, a focus frame If superimposed on a live view image (here, an example in which a subject as a person is displayed) and drive mode information Id are displayed on the display panel 101. The focus frame If is a frame indicating a subject in focus, and the drive mode information Id is information indicating which drive mode of the single shooting mode and the continuous shooting mode is set. In the present example, only in the continuous shooting mode, an image schematically illustrating a plurality of images as illustrated in the figure is displayed.

As first notification information I1 for making a notification of the timing at which the number of processed frames M matches the number of discard images N, it is conceivable to display an image indicating characters "Ready" as illustrated in the figure. For example, as illustrated in the figure, by displaying the first notification information I1 in the vicinity of the drive mode information Id, it is possible to allow the user to intuitively understand that the "continuous shooting" indicated by the drive mode information Id is in the "Ready" state.

Note that what kind of information is displayed as the first notification information I1 is not particularly limited. For example, it is conceivable to display not only information indicating characters but also information indicating a predetermined figure. Alternatively, the first notification information I1 is not limited to visual information, but may be output as auditory information or tactile information such as vibration.

By making the notification of the first notification information I1 as described above, it is possible to notify the user of the timing at which the captured image corresponding to the number of discard images N is processed by the MCTF process started before the continuous shooting starts, that is, the timing at which the number of discard images is zero.

Therefore, it is possible to prompt the user to start continuous shooting at the timing when the number of discard images N is 0, and it is possible to prevent occurrence of shutter lag in continuous shooting.

In FIG. 5, the frame rate control unit F4 performs control of reducing the processing frame rate of the live view image generation unit 34 in response to the processing start control unit F2 starting the MCTF process.

In the camera signal processing unit 13, the default processing frame rate of the live view image generation unit 34 is 60 fps. The frame rate control unit F4 in the present example decreases the processing frame rate of the live view image generation unit 34 from 60 fps to 30 fps in response to the processing start control unit F2 starting the MCTF process.

As a result, it is possible to suppress an increase in power consumption of the imaging device 1 (power consumption of the camera signal processing unit 13) in a case where the MCTF process is started before continuous shooting starts.

Note that, in the camera signal processing unit 13 in the continuous shooting mode, the processing frame rates of the MCTF unit 32 and the second image processing unit 33 is 20 fps in the high-speed continuous shooting mode and 10 fps in the low-speed continuous shooting mode as described above.

Furthermore, in the above description, an example is described in which the processing frame rate of the live view image generation unit 34 is decreased from 60 fps to 30 fps; however, it goes without saying that these numerical values are merely an illustrative example and are not limited to these numerical values.

1-4. Processing Procedure

An example of a specific processing procedure for realizing the discard image number adjustment method as the first embodiment described above will be described with reference to a flowchart of FIG. 7.

Figure 7:
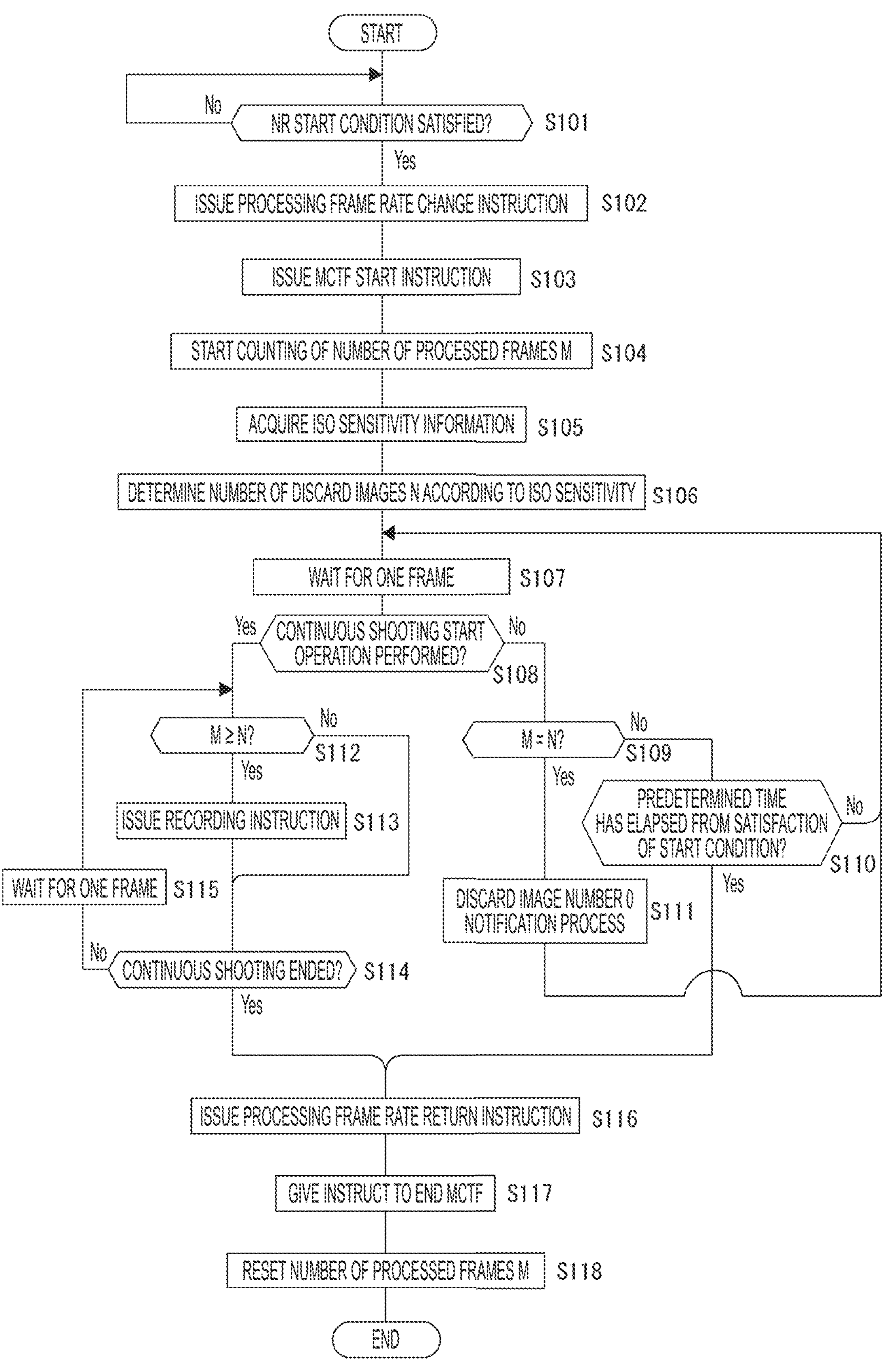
FIG. 7 is a flowchart illustrating a specific processing procedure example for realizing a discard image number adjustment method as the first embodiment.

Note that the camera control unit 18 executes the processing illustrated in FIG. 7 on the basis of a program stored in a storage device such as a ROM in the memory unit 19.

The processing illustrated in FIG. 7 is executed in the setting state of the continuous shooting mode.

In FIG. 7, the camera control unit 18 waits until the NR start condition is satisfied in step S101. Here, the satisfaction of the NR start condition means satisfaction of the above-described "predetermined condition regarding imaging before continuous shooting starts" as a trigger for starting the MCTF process. That is, for example, the satisfaction is any of the half-pressing operation of the shutter button 110S, the touch focus operation, the AF lock operation, the touch AE operation, the AE lock operation, and the fact that the imaging device 1 is mounted on the support, which have been exemplified above.

In a case where it is determined in step S101 that the NR start condition is satisfied, the camera control unit 18 issues a processing frame rate change instruction in step S102. That is, as exemplified above, the camera signal processing unit 13 is instructed to decrease the processing frame rate of the live view image generation unit 34.

In step S103 following step S102, the camera control unit 18 issues an MCTF start instruction. That is, the camera signal processing unit 13 is instructed to cause the MCTF unit 32 to start the MCTF process (three-dimensional noise reduction process in this example) on the input captured image.

In step S104 following step S103, the camera control unit 18 starts counting the number of processed frames M. Thereafter, the camera control unit 18 counts up the number of processed frames M every time the MCTF unit 32 performs the MCTF process on one captured image.

In step S105 following step S104, the camera control unit 18 performs an ISO sensitivity information acquisition process. That is, information about the currently set ISO sensitivity is acquired.

Then, in step S106 following step S105, the camera control unit 18 determines the number of discard images N according to the ISO sensitivity. That is, as exemplified above, the number of discard images N is determined so as to have a positive correlation with the ISO sensitivity.

In step S107 following step S106, the camera control unit 18 performs a process of waiting for one frame.

In step S108 following step S107, the camera control unit 18 waits for the continuous shooting start operation. That is, in the present example, the release operation using the shutter button 110S (the full-pressing operation of the shutter button 110S) is waited.

In a case where it is determined in step S108 that there is no continuous shooting start operation, the camera control unit 18 advances the process to step S109 and determines whether or not "M=N". That is, it is determined whether or not the number of processed frames M matches the number of discard images N determined in step S106.

In a case where it is determined in step S109 that "M=N" is not satisfied, the camera control unit 18 advances the process to step S110 and determines whether or not a predetermined time has elapsed since the start condition was satisfied. That is, it is determined whether or not the elapsed time from the satisfaction of the NR start condition in step S101 is a predetermined time or more. In a case where it is determined in step S110 that the predetermined time has not elapsed from the satisfaction of the start condition, the camera control unit 18 returns the process to step S107.

After the MCTF process for one frame is started in response to the satisfaction of the NR start condition by the processing in steps S107 to S110 described above, a loop process of waiting for the completion of the MCTF process of the next frame is formed until any of the conditions of the continuous shooting start operation, "M=N", and the elapse of a predetermined time from the satisfaction of the start condition is satisfied.

In a case where it is determined in step S109 that "M=N", the camera control unit 18 advances the process to step S111 and performs a discard image number 0 notification process. That is, the display unit 15 displays the first notification information I1 on the display panel 101.

As a result, it is possible to notify the user of the timing at which the number of discard images N is 0 by the MCTF process started before the continuous shooting start operation.

The camera control unit 18 returns the process to step S111 in response to the execution of the notification process in step S107. As a result, the continuous shooting start operation can be waited after the number of discard images N is zero.

In addition, in a case where it is determined in step S110 that the predetermined time has elapsed since the start condition is satisfied, the camera control unit 18 advances the process to step S116.

In step S116, the camera control unit 18 instructs the camera signal processing unit 13 to return the processing frame rate of the live view image generation unit 34 to the original frame rate (60 fps in this example) as the processing frame rate return instruction.

Then, in step S117 following step S116, the camera control unit 18 instructs the camera signal processing unit 13 to end the three-dimensional noise reduction process by the MCTF unit 32 as an instruction to end the MCTF, resets the number of processed frames M in subsequent step S118, and ends the series of processing illustrated in FIG. 7.

In a case where the continuous shooting start operation is not performed even after a predetermined time has elapsed since the start condition is satisfied after the MCTF process is started before the continuous shooting start operation in this manner, the MCTF process is stopped. As a result, it is possible to prevent power consumption in the camera signal processing unit 13 before continuous shooting starts.

Note that, here, as a response to a case where the continuous shooting start operation is not performed after the start of the MCTF process, an example is described in which the MCTF process is stopped according to the elapsed time from the satisfaction of the start condition of the MCTF process. However, it is also conceivable to stop the MCTF process according to the number of processed frames M from the satisfaction of the start condition of the MCTF process.

In a case where it is determined in step S108 that the continuous shooting start operation has been performed, the camera control unit 18 determines whether or not "M≥N" in step S112. That is, it is determined whether or not the number of processed frames M is equal to or larger than the number of discard images N determined in step S106.

In a case where it is determined in step S112 that "M≥N", the camera control unit 18 issues a recording instruction in step S113. That is, after the three-dimensional noise reduction process is performed by the MCTF unit 32, an instruction is given to the recording control unit 14 to record the image file of the latest frame obtained by performing the file forming process of the second image processing unit 33 on the recording medium.

In response to issuing the recording instruction in step S113, the camera control unit 18 determines in step S114 whether or not continuous shooting is finished. In this example, the continuous shooting is performed while the release operation is continued, and the end of the release operation is set as the end timing of the continuous shooting. Therefore, in step S114, it is determined whether or not the release operation has ended.

Note that continuous shooting may be continued until a predetermined time elapses after the continuous shooting start operation is performed or until a predetermined number of images are recorded. In this case, in step S114, it is only required to determine whether or not the conditions of the elapse of the predetermined time and the completion of the recording of the predetermined number of images are satisfied.

In a case where it is determined in step S114 that continuous shooting is not ended, the camera control unit 18 performs a process of waiting for one frame in step S115, and then returns the process to step S112.

In a case where it is determined in step S112 that "M≥N" is not satisfied, the camera control unit 18 passes the process of step S113 and advances the process to step S114. That is, even the captured image on which the MCTF process is performed is not recorded on the recording medium until the number of processed frames M reaches the number of discard images N.

In a case where it is determined in step S114 that continuous shooting is ended, the camera control unit 18 advances the process to step S116. That is, in a case where continuous shooting ends, the camera control unit 18 performs the processing cycle return instruction (S116), the MCTF end instruction (S117), and the reset of the number of processed frames M (S118) described above, and ends the series of processing illustrated in FIG. 7.

1-5. Discard Image Number Adjustment Method as Another Example

In the above description, while an example is described in which the MCTF process is started in response to satisfaction of the predetermined condition before the continuous shooting start operation in the continuous shooting mode, the MCTF process can also be started in response to the continuous shooting start operation.

In the above example, while the number of discard images N is determined on the basis of the ISO sensitivity, in particular, in a case where the MCTF process is started in response to the continuous shooting start operation, the number of discard images N can be determined according to which imaging mode is set among a plurality of imaging modes with which different numbers of discard images N are associated.

For example, in the imaging device 1, a lag suppression priority mode/an image quality priority mode/an intermediate mode are provided as modes related to continuous shooting.

The lag suppression priority mode is a mode in which the suppression of the shutter lag in continuous shooting is prioritized over the improvement in image quality by the MCTF process, and, conversely, the image quality priority mode is a mode in which the improvement in image quality by the MCTF process is prioritized over the suppression of the shutter lag in continuous shooting. The intermediate mode is a mode in which with respect to the priority of the shutter lag in continuous shooting and the priority of the improvement in image quality by the MCTF process, the intermediate priority in the lag suppression priority mode and the image quality priority mode is set.

The different numbers of discard images N are associated with the lag suppression priority mode, the image quality priority mode, and the intermediate mode.

Figures 8A, 8B, 8C:
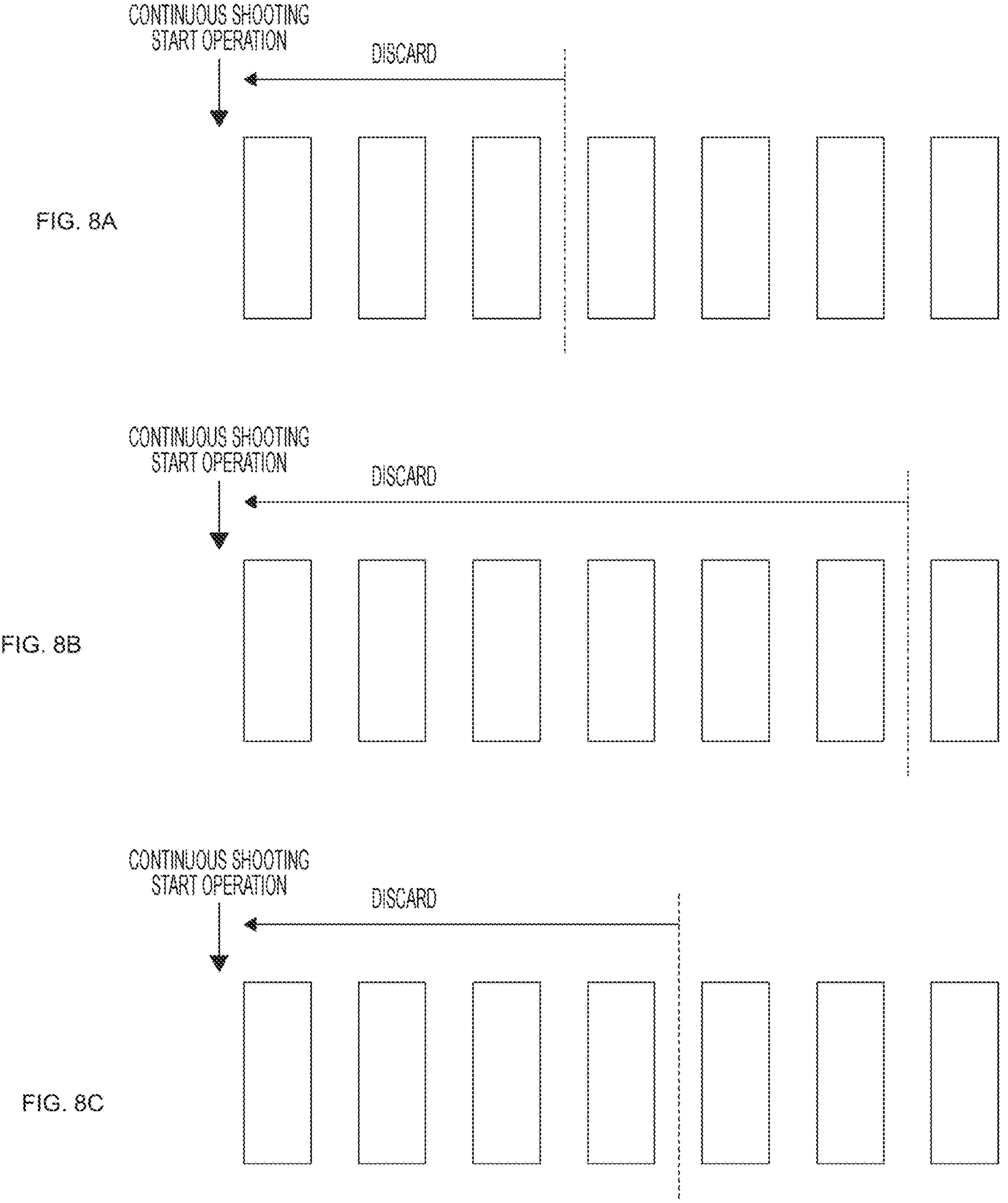
FIGS. 8A, 8B, and 8C are diagrams showing an example of association of the number of discard images N for each mode.

FIGS. 8A, 8B, and 8C illustrate an example of association of the number of discard images N for each mode.

FIG. 8A illustrates the number of discard images N in the lag suppression priority mode, FIG. 8B illustrates the number of discard images N in the image quality priority mode, and FIG. 8C illustrates the number of discard images N in the intermediate mode. As illustrated, the number of discard images N in each mode is set to, for example, lag suppression priority mode<intermediate mode<image quality priority mode, such as the lag suppression priority mode=3, the image quality priority mode=6, and the intermediate mode=4.

Here, the imaging mode with which the number of discard images N is associated is not limited to the modes related to the continuous shooting function such as the lag suppression priority mode, the image quality priority mode, and the intermediate mode described above.

For example, the number of discard images N may be associated with each of the automatic imaging mode and the program automatic imaging mode described above, and the number of discard images N may be changed according to which of the automatic imaging mode and the program automatic imaging mode is set.

For example, it is conceivable to set the number of discard images N in the automatic imaging mode to 6 and the number of discard images N in the program automatic imaging mode to 3. Alternatively, conversely, it is conceivable to set the number of discard images N in the automatic imaging mode to 3 and the number of discard images N in the program automatic imaging mode to 6.

It can be assumed that the user who intentionally sets the program automatic imaging mode instead of the automatic imaging mode is conscious of the shutter timing, and it is estimated that the user desires to suppress the shutter lag at the time of continuous shooting, so that it is conceivable to reduce the number of discard images. Conversely, it can be assumed that the user who intentionally sets the program automatic imaging mode instead of the automatic imaging mode is conscious of the image quality of the captured image, and in this case, it is conceivable to increase the number of discard images.

In a case where the number of discard images N is changed according to which of the automatic imaging mode and the program automatic imaging mode is set as described above, the number of discard images N can be adaptively changed according to these cases.

Therefore, it is possible to appropriately balance the suppression of the shutter lag in the continuous shooting and the improvement in image quality of the continuously captured images according to the user's intention estimated from the imaging mode setting.

Note that it is desirable to determine the number of discard images N associated with each mode on the basis of the actual convergence speed of the MCTF process, and it goes without saying that the number of discard images N associated with each mode is not limited to the above numerical example.

Furthermore, in the present example, it is assumed that the number of discard images N associated with each mode is fixed, but the number of discard images N for each mode can be variably determined on the basis of other imaging settings such as ISO sensitivity.

Figure 9:
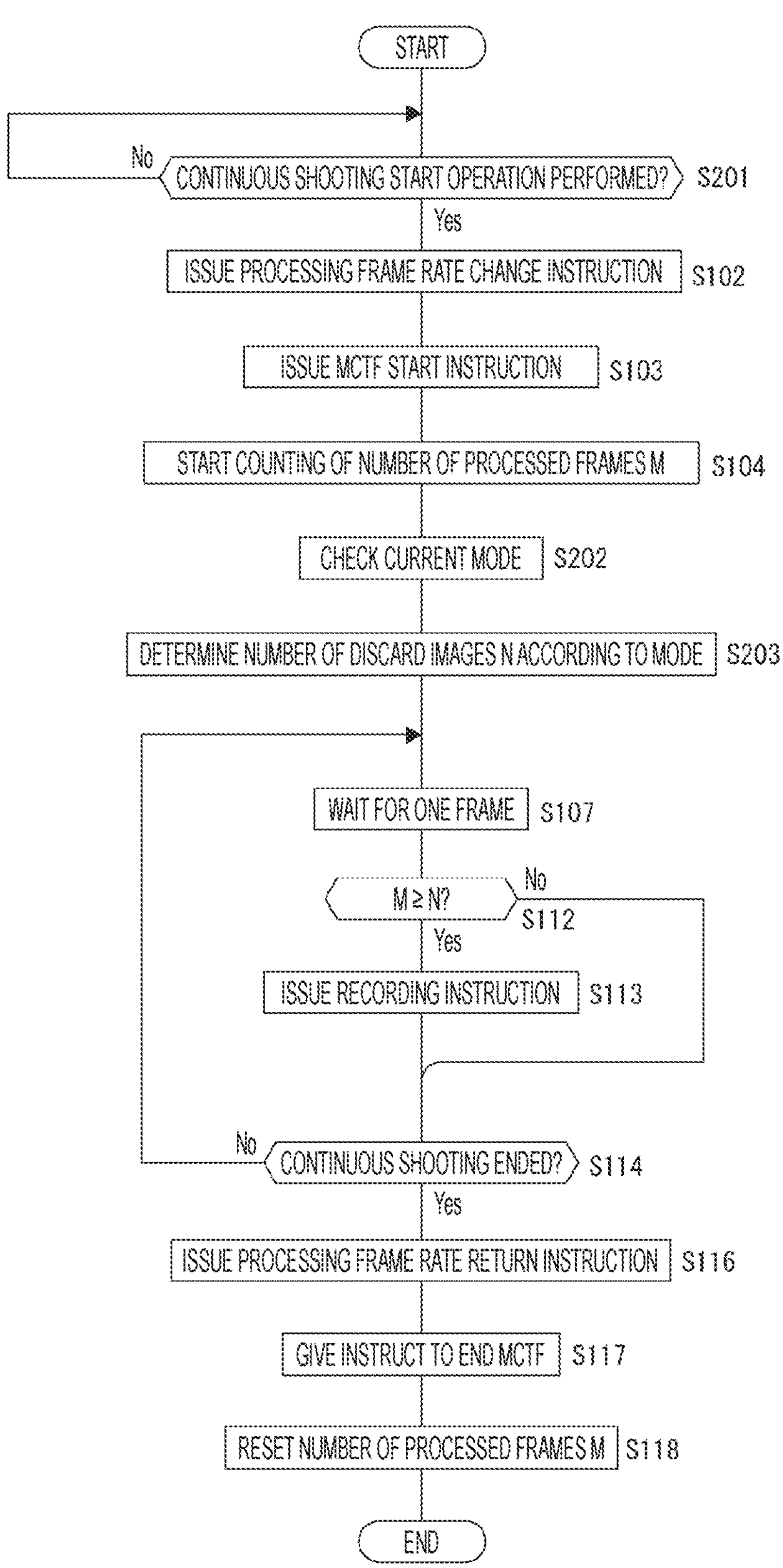
FIG. 9 is a flowchart illustrating a specific processing procedure example for realizing a discard image number adjustment method as another column of the first embodiment.

FIG. 9 is a flowchart illustrating a specific processing procedure example for realizing the discard image number adjustment method as another column described above.

Note that the processing illustrated in FIG. 9 is also executed by the camera control unit 18 on the basis of a program stored in a storage device such as a ROM in the memory unit 19, and the processing illustrated in FIG. 9 is also executed in the setting state of the continuous shooting mode.

Here, in the following description, the same reference numerals or the same step numbers are given to portions similar to those already described, and detailed description thereof is omitted.

In this case, the camera control unit 18 first waits for the continuous shooting start operation in step S201. That is, in the present example, the release operation in the continuous shooting mode is waited.

In a case where it is determined in step S201 that the continuous shooting start operation has been performed, the camera control unit 18 executes the processing in step S102 (processing frame rate change instruction), S103 (MCTF start instruction), and step S104 (count start of the number of processed frames M), and then advances the process to step S202.

In step S202, the camera control unit 18 performs a current mode checking process. That is, it is determined whether or not the current imaging mode is the lag suppression priority mode, the image quality priority mode, or the intermediate mode, or whether or not the current imaging mode is the automatic imaging mode or the program automatic imaging mode.

Then, in step S203 following step S202, the camera control unit 18 determines the number of discard images N according to the mode. Note that an example of the number of discard images N determined for each mode has already been described, and thus duplicate description is avoided.

In this case, the camera control unit 18 performs the one frame standby process of step S107 in response to the determination of the number of discard images N in step S203, and then performs the process of steps S112 to S114. In this case, in a case where it is determined in step S114 that continuous shooting is not ended, the camera control unit 18 returns the process to step S107.

As a result, the recording of the continuously captured images is not performed until the frame is reached in which the number of processed frames M is the number of discard images N by the MCTF process started in response to the continuous shooting start operation, and the recording of the continuously captured images is started from the frame in which the number of processed frames M is the number of discard images N+1.

Also in this case, the camera control unit 18 executes the process of steps S116, S117, and S118 in response to the determination of the end of continuous shooting in step S114. Then, the series of processing illustrated in FIG. 9 is terminated when the process in step S118 is executed.

Note that, in the process of FIG. 9, the camera control unit 18 executes the process of steps S102 and S116 in this case. This makes it possible to suppress an increase in power consumption of the camera signal processing unit 13 during the MCTF process in a case where the MCTF process is started in response to the continuous shooting start operation.

Here, in a case where the MCTF process is started in response to the continuous shooting start operation as in the above-described another example, the number of discard images N can be determined not on the basis of the setting of the imaging mode but on the basis of the ISO sensitivity.

1-6. Another Example of Notification Process

Here, in the above example, the frame rate of the continuously captured images at the time of continuous shooting is selected from two of the frame rate as the high-speed continuous shooting mode and the frame rate as the low-speed continuous shooting mode, but the frame rate of the continuously captured images at the time of continuous shooting may be variable according to the shutter speed determined by the AE function. In such a case, in a case where the shutter speed is slow, the frame rate of the continuously captured images also decreases, and as a result, the shutter lag in the continuous shooting increases.

Therefore, on the premise that the frame rate of the continuously captured images changes according to the shutter speed as described above, it is conceivable to make a notification that the shutter lag increases in a case where the shutter speed is slow.

Figure 10:
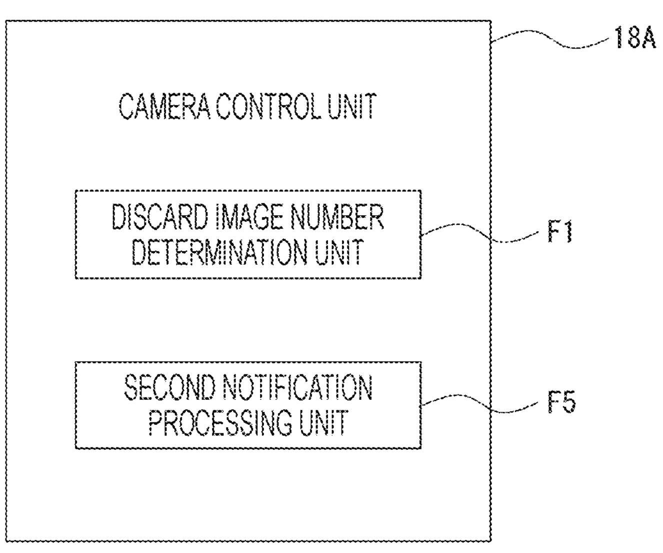
FIG. 10 is a functional block diagram for describing functions of an information processing device in another example of a notification process.

FIG. 10 is a functional block diagram for describing the function of a camera control unit 18A included in the imaging device 1 in a case where such notification is made.

Note that the camera control unit 18A has a hardware configuration similar to that of the camera control unit 18, but has a different function, and thus is denoted by a different reference sign.

The hardware configuration of the imaging device 1 in this case is similar to that described above with reference to FIGS. 1 to 3, and thus redundant description is avoided.

As illustrated, the camera control unit 18A includes a second notification processing unit F5 and the discard image number determination unit F1 described above.

In a case where the continuous shooting mode is set in the imaging device 1, the second notification processing unit F5 performs control such that a notification indicating that the shutter speed is equal to or lower than a predetermined speed is made to the user.

Figure 11:
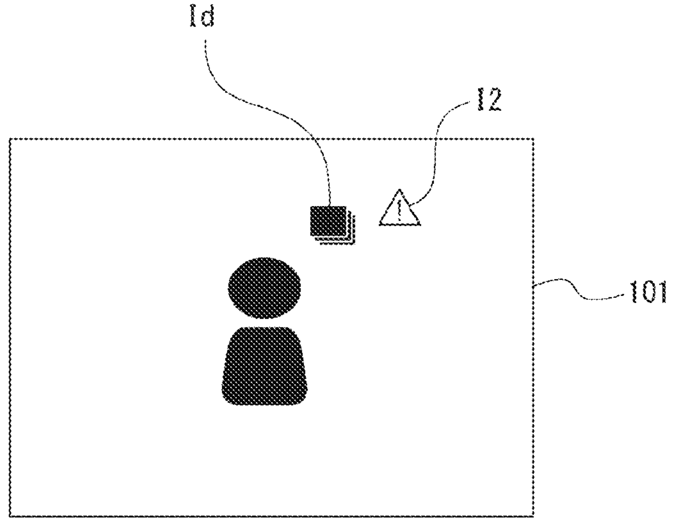
FIG. 11 is a diagram illustrating an example of notification information displayed by a second notification processing unit.

Specifically, in a case where it is confirmed that the shutter speed is equal to or lower than the predetermined speed as described above, the second notification processing unit F5 displays second notification information I2 as illustrated in FIG. 11 on the display panel 101.

As the second notification information I2, information for calling the user's attention to the fact that the shutter lag in continuous shooting increases because the shutter speed is equal to or lower than a predetermined speed is displayed. Specifically, for example, as illustrated in the figure, it is conceivable to display an image with the "!" mark.

In the example in the figure, the second notification information I2 is displayed in the vicinity of the drive mode information Id indicating the continuous shooting mode, and this makes it possible to allow the user to intuitively understand that attention is required regarding "continuous shooting".

Note that what kind of information is displayed as the second notification information I2 is not particularly limited, and for example, it is also conceivable to display not only information indicating a figure but also information indicating a predetermined character. As in the first notification information I1 described above, the second notification information I2 is not limited to visual information, but may be output as auditory information or tactile information such as vibration.

By making the notification of the second notification information I2 as described above, it is possible to alleviate the uncomfortable feeling of the user as compared with the case where the shutter lag occurs without notification.

Figure 12:
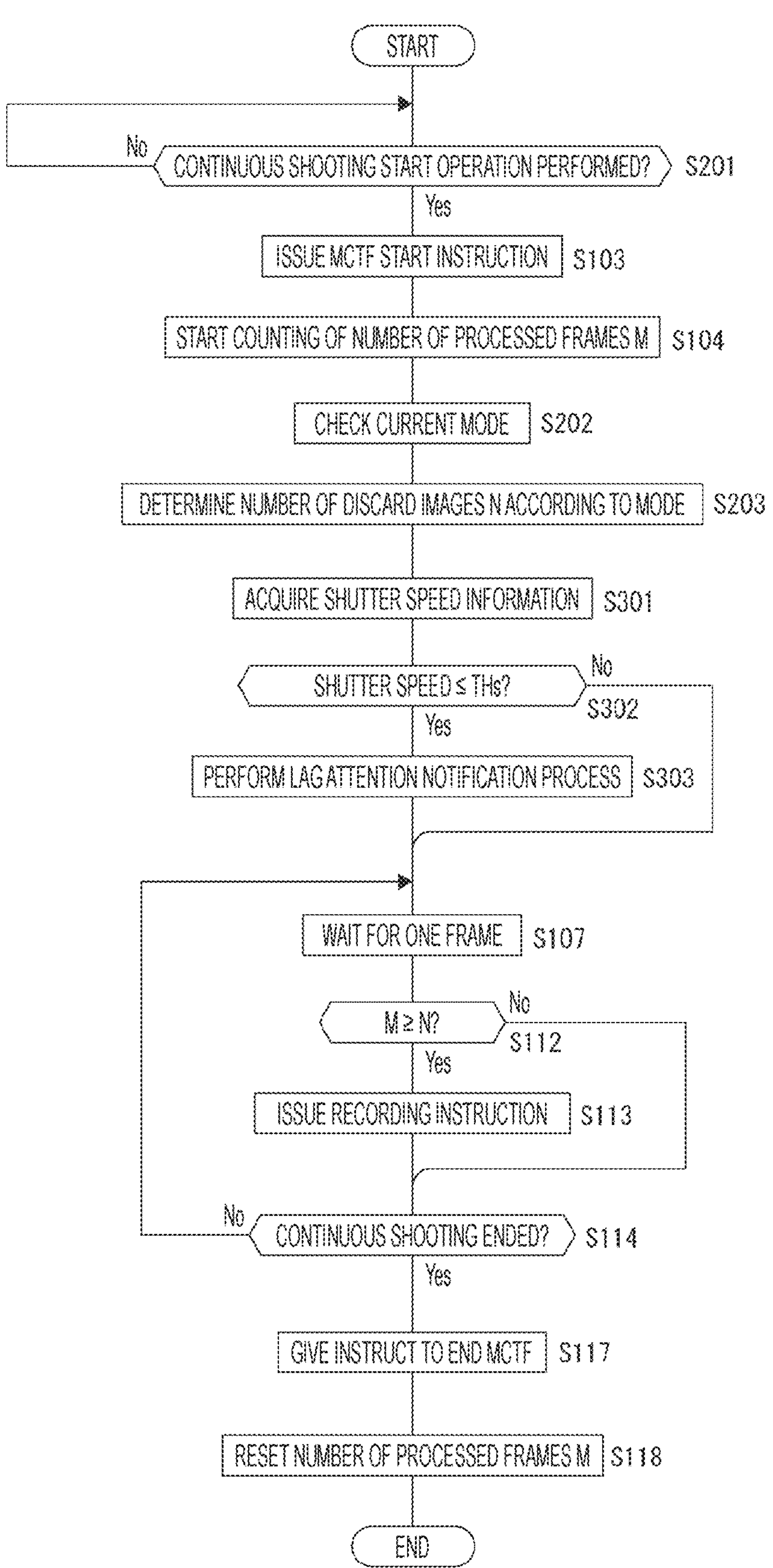
FIG. 12 is a flowchart illustrating a specific processing procedure example for realizing another example of the notification process.

FIG. 12 is a flowchart illustrating a specific processing procedure example to be executed in the continuous shooting mode corresponding to a case where notification of the second notification information I2 is made.

The processing illustrated in FIG. 12 is executed by the camera control unit 18A on the basis of a program stored in a storage device such as a ROM in the memory unit 19 in a setting state of the continuous shooting mode.

Here, as in the case of the another example illustrated in FIG. 9, the MCTF process is started in response to the continuous shooting start operation.

The camera control unit 18A performs a standby process of the continuous shooting start operation in step S201, and advances the process to step S103 in a case where the continuous shooting start operation has been performed. Note that, also in this case, the process of steps S104, S202, and S203 is executed after step S103, which is similar to the case of FIG. 9.

The camera control unit 18A performs the shutter speed information acquisition process in step S301 in response to the determination of the number of discard images N in step S203. As described above, here, it is assumed that the frame rate of the continuously captured images is variable according to the shutter speed determined by the AE function. In step S301, the process of acquiring information about the shutter speed determined by the AE function as described above is performed.

In step S302 following step S301, the camera control unit 18A determines whether or not the shutter speed is equal to or less than a threshold value THs.

In a case where the shutter speed is equal to or less than the threshold value THs, the camera control unit 18A advances the process to step S303, executes a lag attention notification process, that is, a process for making a notification of the second notification information I2 as described above to the user, and advances the process to step S107.

On the other hand, in a case where it is determined in step S302 that the shutter speed is more than the threshold value THs, the camera control unit 18A passes the notification process in step S303 and advances the process to step S107.

In this case, after the process of step S107, the process of steps S112, S113, and S114 is executed as in the case of FIG. 9.

In a case where it is determined in step S114 that continuous shooting is ended, the camera control unit 18A performs the reset process of the number of processed frames M in step S118 after giving an instruction to end the MCTF in step S117, and ends the series of processing illustrated in FIG. 12.

Note that, unlike the process of FIG. 9, in the above description, the process of steps S102 and S116 is not executed, but by executing the process of steps S102 and S116 in the case of FIG. 12, it is possible to suppress an increase in power consumption of the camera signal processing unit 13 during the MCTF process in a case where the MCTF process is started in response to the continuous shooting start operation.

In the above example, while the notification of the second notification information I2 is made in response to the continuous shooting start operation, the notification of the second notification information I2 may be made at a timing before the continuous shooting start operation in the continuous shooting mode.

By making a notification before the start of continuous shooting, it is possible for the user to determine in advance whether or not to perform continuous shooting.

Here, also in a case where the MCTF process is started in response to satisfaction of the predetermined condition before the continuous shooting start operation as illustrated in FIG. 7, it is possible to make a notification of the second notification information I2 as described above.

2. Second Embodiment

Next, the second embodiment will be described. The second embodiment is an embodiment related to a case where not only the three-dimensional noise reduction process by MCTF but also a multi frame NR (MFNR) process can be executed as the NR process.

Two examples of the first example and the second example of the second embodiment will be described below.

2-1. First Example

In the first example, as the NR process for continuously captured images, NR mode switching is performed between a first NR mode in which the MFNR process using a finite impulse response (FIR) filter is performed and a second NR mode in which the three-dimensional NR process using the MCTF is performed.

Figure 13:
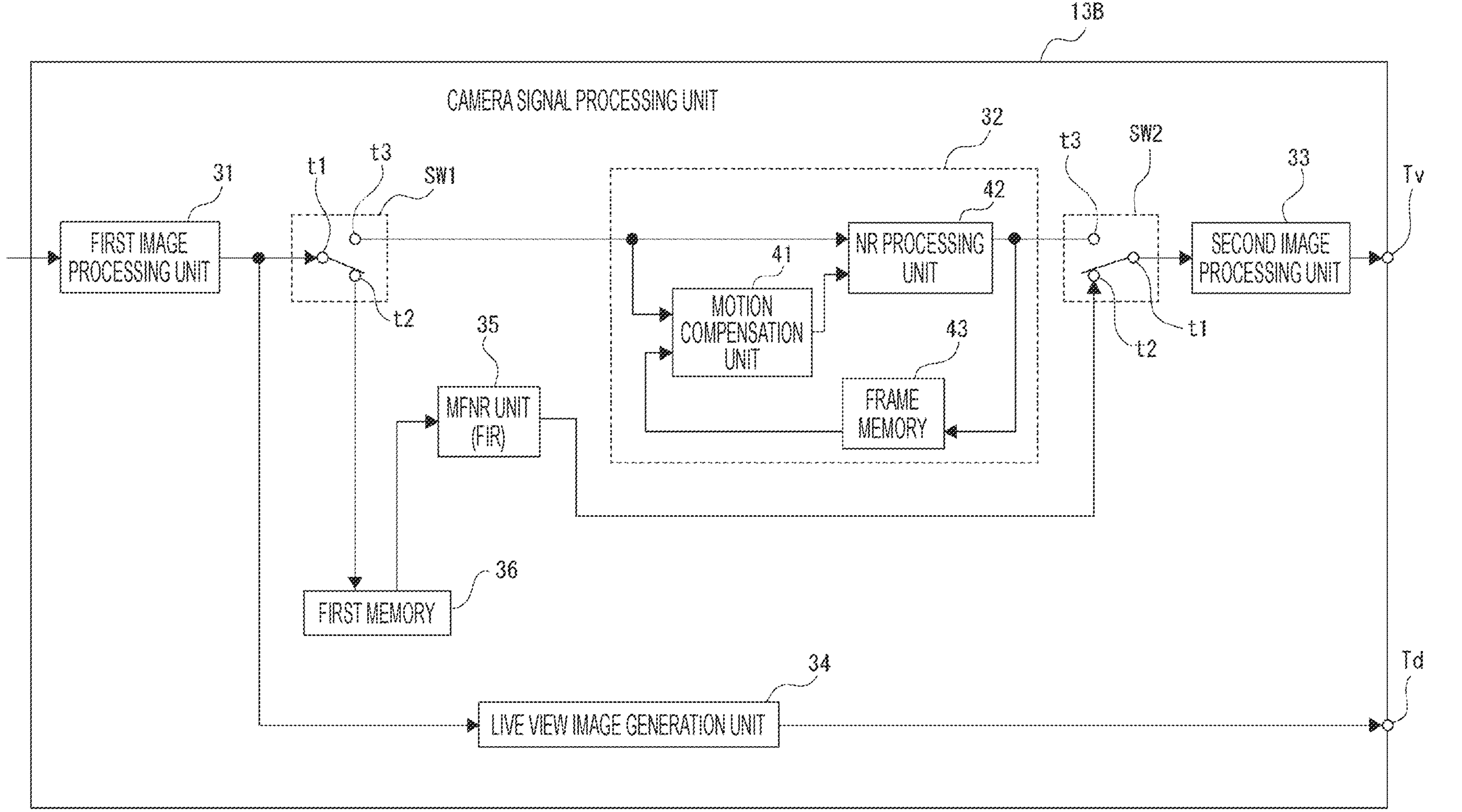
FIG. 13 is a block diagram illustrating a schematic internal configuration example of a camera signal processing unit included in an information processing device as a first example in the second embodiment.

FIG. 13 is a block diagram illustrating a schematic internal configuration example of a camera signal processing unit 13B included in the imaging device 1 as the first example in the second embodiment.

Here, the hardware configuration of the imaging device 1 as the first example in the second embodiment is similar to that described above with reference to FIGS. 1 and 2 except that the camera signal processing unit 13B is provided instead of the camera signal processing unit 13, and thus duplicate description is avoided.

The camera signal processing unit 13B is different from the camera signal processing unit 13 (see FIG. 3) in that a first switch SW1, a second switch SW2, an MFNR unit 35, and a first memory 36 are added.

Each of the first switch SW1 and the second switch SW2 is configured as a three-terminal switch configured such that a connection terminal for a terminal t1 can be selected between a terminal t2 and a terminal t3.

As illustrated, the first switch SW1 is inserted between the first image processing unit 31 and the MCTF unit 32, the output of the first image processing unit 31 is input to the terminal t1, the terminal t2 is connected to the input terminal of the first memory 36, and the terminal t3 is connected to the input terminal of the MCTF unit 32.

That is, in the first switch SW1, in a case where the terminal t2 is selected, the output image by the first image processing unit 31 is stored in the first memory 36, and in a case where the terminal t3 is selected, the output image by the first image processing unit 31 is input to the MCTF unit 32.

Figure 14:
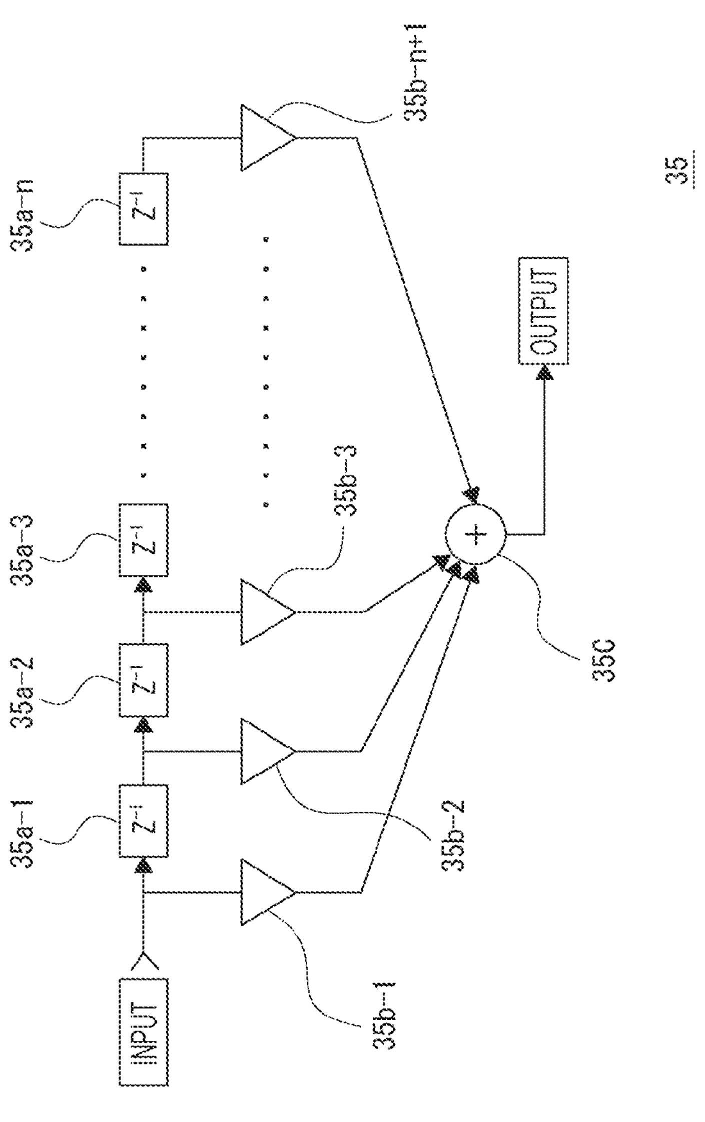
FIG. 14 is a diagram illustrating an internal configuration example of an MFNR unit included in an information processing device as a first example in the second embodiment.

As illustrated in FIG. 14, the MFNR unit 35 is configured as an FIR filter including, for example, n delay circuits 35*a* (35*a*-1, 35*a*-2, 35*a*-3, . . . , 35*a*-*n*), n+1 multiplication units 35*b* (35*b*-1, 35*b*-2, 35*b*-3, . . . , 35*b*-*n*+1), and an addition unit 35*c*.

The MFNR unit 35 performs the NR process on the latest continuously captured image by using a total of n+1 continuously captured images of the latest continuously captured image and the n continuously captured images before the latest continuously captured image. Specifically, for example, n=3.

The MFNR process as described above is different from the MCTF process using the IIR filter, and the NR process on the first continuously captured image after the start of continuous shooting can be performed using a plurality of continuously captured images, so that the NR effect can be obtained from the first continuously captured images. Therefore, according to the MFNR process, a shutter lag in continuous shooting does not occur in principle.

In FIG. 13, the first memory 36 has a capacity capable of buffering the latest continuously captured image and the n continuously captured images before the latest continuously captured image. Alternatively, the first memory 36 has a capacity capable of buffering n continuously captured images before the latest continuously captured image.

In the former case, in response to the n+1 continuously captured images including the latest continuously captured image being buffered in the first memory 36, the MFNR unit 35 sequentially receives the n+1 buffered continuously captured images and performs the NR process using the FIR filter.

In the latter case, in the first memory 36, in response to the latest continuously captured image being input from the first image processing unit 31 in a state in which n continuously captured images before the latest continuously captured image are buffered, the MFNR unit 35 sequentially receives (in chronological order) n+1 continuously captured images including the latest continuously captured image and performs the NR process using the FIR filter.

In the second switch SW2, the output of the MCTF unit 32 is input to the terminal t3, the output of the MFNR unit 35 is input to the terminal t2, and the input terminal of the second image processing unit 33 is connected to the terminal t1.

That is, in a case where the terminal t2 is selected in the second switch SW2, the continuously captured images on which the NR process is performed by the MFNR unit 35 is input to the second image processing unit 33, and in a case where the terminal t3 is selected, the continuously captured images on which the NR process is performed by the MCTF unit 32 is input to the second image processing unit 33.

Figure 15:
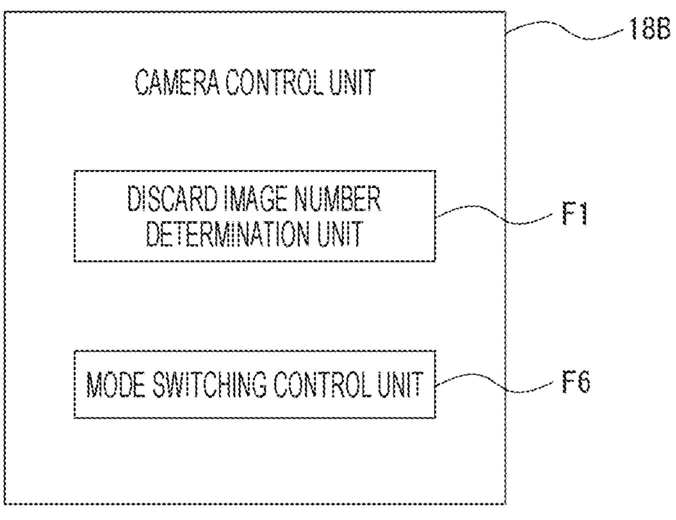
FIG. 15 is a functional block diagram for describing functions of an information processing device as a first example in the second embodiment.

FIG. 15 is a functional block diagram illustrating functions of the camera control unit 18 (hereinafter referred to as a "camera control unit 18B") included in an imaging device 1 as the first example in the second embodiment.

The camera control unit 18B has functions as the discard image number determination unit F1 and a mode switching control unit F6.

The mode switching control unit F6 performs mode switching control between the first NR mode and the second NR mode with respect to the NR process for the continuously captured images. Specifically, the mode switching control unit F6 of the present example performs switching control of the first NR mode/the second NR mode on the basis of the setting information related to designation of the shutter speed at the time of continuous shooting.

For example, information about the shutter speed in the continuous shooting mode is acquired, and in a case where the shutter speed is equal to or less than a predetermined threshold value THc (that is, in a case where it is predicted that the shutter lag in a case where the MCTF process is performed is large), the first NR mode is set as the NR mode, and the MFNR process is performed on the continuously captured images. Conversely, in a case where the shutter speed is more than the threshold value THc, the second NR mode is set as the NR mode, and the three-dimensional noise reduction process by the MCTF is performed on the continuously captured images.

Alternatively, in a case where the high-speed continuous shooting mode and the low-speed continuous shooting mode can be selectively set as the continuous shooting mode, information indicating which of the high-speed continuous shooting mode and the low-speed continuous shooting mode is set as the continuous shooting mode can also be used as the "setting information related to designation of the shutter speed at the time of continuous shooting". Specifically, in this case, the first NR mode is set in a case where the low-speed continuous shooting mode is set, and the second NR mode is set in a case where the high-speed continuous shooting mode is set.

By performing the switching control of the NR mode as described above, it is possible to improve image quality by performing the first NR process in which the shutter lag does not occur in a case where it is predicted that the shutter lag associated with the image discard increases in terms of the shutter speed at the time of continuous shooting, and by performing the second NR process with motion compensation in a case where it is predicted that the shutter lag associated with the image discard decreases in terms of the shutter speed.

Therefore, it is possible to optimize the balance between the suppression of the shutter lag and the improvement in image quality.

Figure 16:
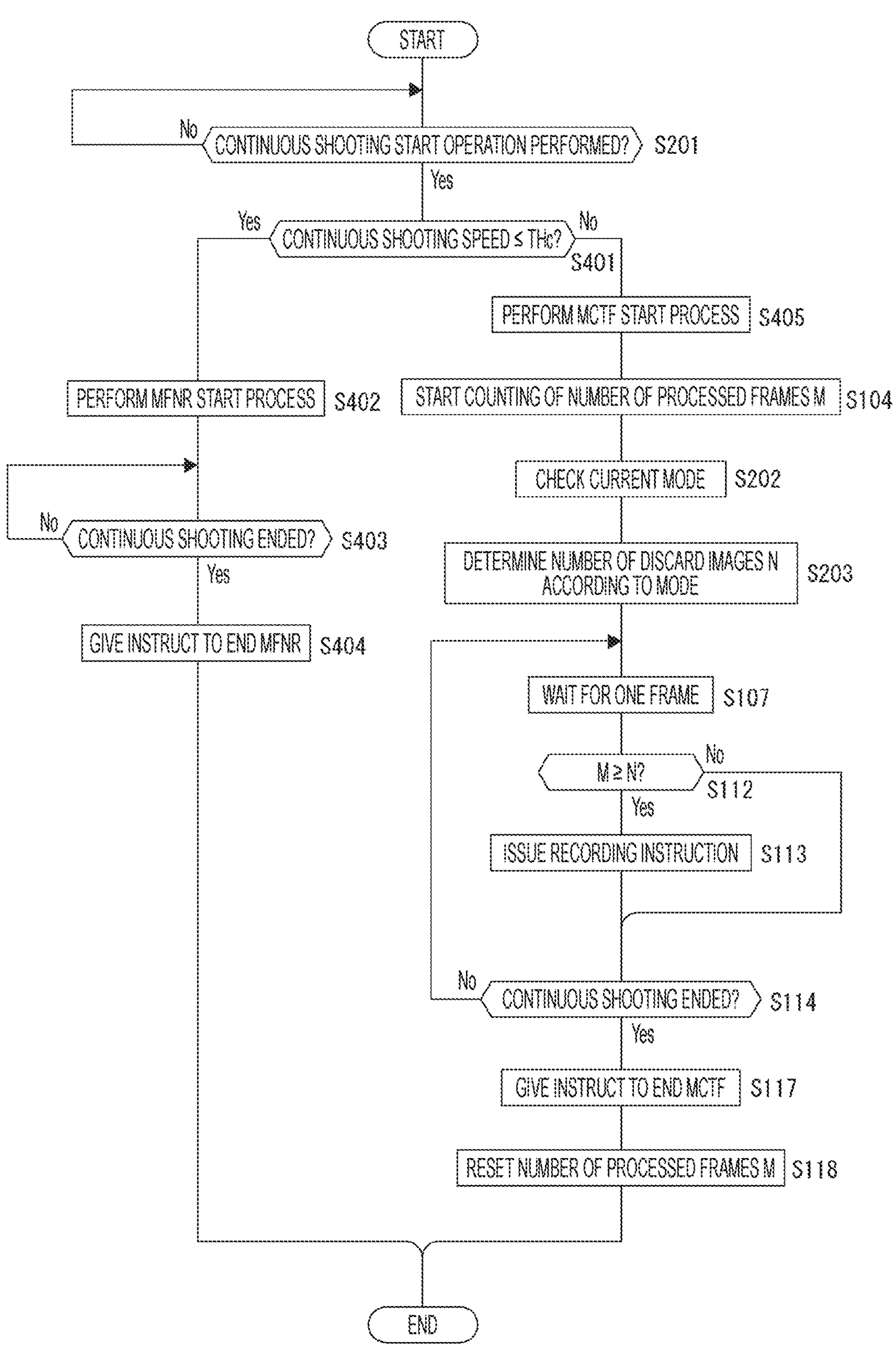
FIG. 16 is a flowchart illustrating a specific processing procedure example for realizing a function as a first example in the second embodiment.

FIG. 16 is a flowchart illustrating a specific processing procedure example for realizing the function as the first example in the second embodiment as described above.

The camera control unit 18B executes the process illustrated in FIG. 16 on the basis of a program stored in a storage device such as a ROM in the memory unit 19 in a setting state of the continuous shooting mode.

Furthermore, in the present example, it is assumed that the captured image is buffered in the first memory 36 (the output image of the first image processing unit 31 is buffered) in the continuous shooting mode. For example, it is conceivable that the buffering of the captured image in the first memory 36 is started in response to the setting of the continuous shooting mode. Alternatively, it is also conceivable that buffering of the captured image in the first memory 36 is started in response to satisfaction of the predetermined condition regarding imaging before the start of continuous shooting illustrated above, such as half-pressing operation of the shutter button 110S, for example.

In any case, in the continuous shooting mode in this case, the terminal t2 is selected in the first switch SW1 and the captured image is buffered in the first memory 36 in a state before the continuous shooting start operation is performed.

First, the camera control unit 18B waits for the continuous shooting start operation in step S201, and in a case where the continuous shooting start operation has been performed, determines in step S401 whether or not the continuous shooting speed is equal to or less than the threshold value THc. That is, information about the current shutter speed is acquired, and it is determined whether or not the shutter speed is equal to or less than the threshold value THc.

Note that, as understood from the above description, in a case where the high-speed continuous shooting mode and the low-speed continuous shooting mode can be selectively set as the continuous shooting mode, the process of determining whether or not it is the low-speed continuous shooting mode may be performed as the process of step S401.

In step S401, in a case where the continuous shooting speed is equal to or less than the threshold value THc, the camera control unit 18B advances the process to step S402 and executes the MFNR start process. That is, the terminal t2 is selected in the second switch SW2, and the MFNR process by the MFNR unit 35 is started.

As a result, in a case where the continuous shooting speed is slow and it is predicted that the shutter lag in a case where the MCTF process is performed is large, the MFNR process is performed as the NR process for the continuously captured images, and the occurrence of the shutter lag is prevented.

In step S403 following step S402, the camera control unit 18B waits for the end of continuous shooting, and in a case where the continuous shooting ends, instructs the camera signal processing unit 13B to end the MFNR in step S404, and ends the series of processing illustrated in FIG. 16.

On the other hand, in a case where it is determined in step S401 that the continuous shooting speed is more than the threshold value THc, the camera control unit 18B advances the process to step S405 and performs the MCTF start process. That is, the terminal t3 is selected in both the first switch SW1 and the second switch SW2, and the MCTF process by the MCTF unit 32 is started.

As a result, in a case where the continuous shooting speed is high and it is predicted that the shutter lag in a case where the MCTF process is performed is small, the MCTF process is performed as the NR process for the continuously captured images, and the image quality is improved.

In response to execution of the start process of step S405, the camera control unit 18B advances the process to step S104. Here, the processes of steps S202, S203, S107, S112, S113, and S114 are executed after step S104 as in the case of FIG. 9 described above. In this case, in a case where it is determined in step S114 that continuous shooting is ended, the camera control unit 18B executes the process of step S117 (MCTF end instruction) and step S118 (reset of the number of processed frames M), and ends the series of processing illustrated in FIG. 16.

Note that, in the above description, in a case where the continuous shooting speed is high, the MCTF process is started in response to the continuous shooting start operation, but, in the first example in the second embodiment, the MCTF process can also be started in response to satisfaction of the predetermined condition regarding imaging before the start of continuous shooting exemplified above, such as the half-pressing operation of the shutter button 110S.

For example, in response to satisfaction of the predetermined condition such as the half-pressing operation of the shutter button 110S, the buffering of the captured image in the first memory 36 and the MCTF process are started, the determination process in step S401 is executed, and the first NR mode/the second NR mode is set according to the determination result. Then, in the second NR mode, the number of discard images N is determined in accordance with the ISO sensitivity and the imaging mode setting.

In this case, in the first NR mode, the MFNR process using the image buffered in the first memory 36 is started in response to the continuous shooting start operation. On the other hand, in the second NR mode, recording control of the continuously captured images based on the number of discard images N and the number of processed frames M is performed according to the continuous shooting start operation. In addition, in the second NR mode in this case, it is also possible to make a notification of the first notification information I1 based on the number of discard images N and the number of processed frames M (discard image number 0 notification).

2-2. Second Example

In the second example in the second embodiment, as the NR process of the continuously captured images, the first NR process by the MFNR process performed on the first image, and the second NR process by the MCTF process performed on the subsequent images are switched.

FIG. 17 is a block diagram illustrating a schematic internal configuration example of a camera signal processing unit 13C included in the imaging device 1 as the second example in the second embodiment.

Here, the hardware configuration of the imaging device 1 as the second example in the second embodiment is similar to that described above with reference to FIGS. 1 and 2 except that the camera signal processing unit 13C is provided instead of the camera signal processing unit 13, and thus duplicate description is avoided.

The camera signal processing unit 13C is different from the camera signal processing unit 13B (see FIG. 13) in that a second memory 37 and a third switch SW3 are added.

The second memory 37 buffers the image on which the MFNR process by the MFNR unit 35 is performed.

As in the first switch SW1 and the second switch SW2, the third switch SW3 is configured as a three-terminal switch configured such that the connection terminal for the terminal t1 can be selected between the terminal t2 and the terminal t3. As illustrated in the figure, the terminal t1 is connected to the feedback image input terminal of the motion compensation unit 41 in the MCTF unit 32, the output image from the second memory 37 is input to the terminal t2, and the output image from the frame memory 43 in the MCTF unit 32 is input to the terminal t3.

In the camera signal processing unit 13C, the output image from the second memory 37 is input to the terminal t2 of the second switch SW2.

Figure 18:
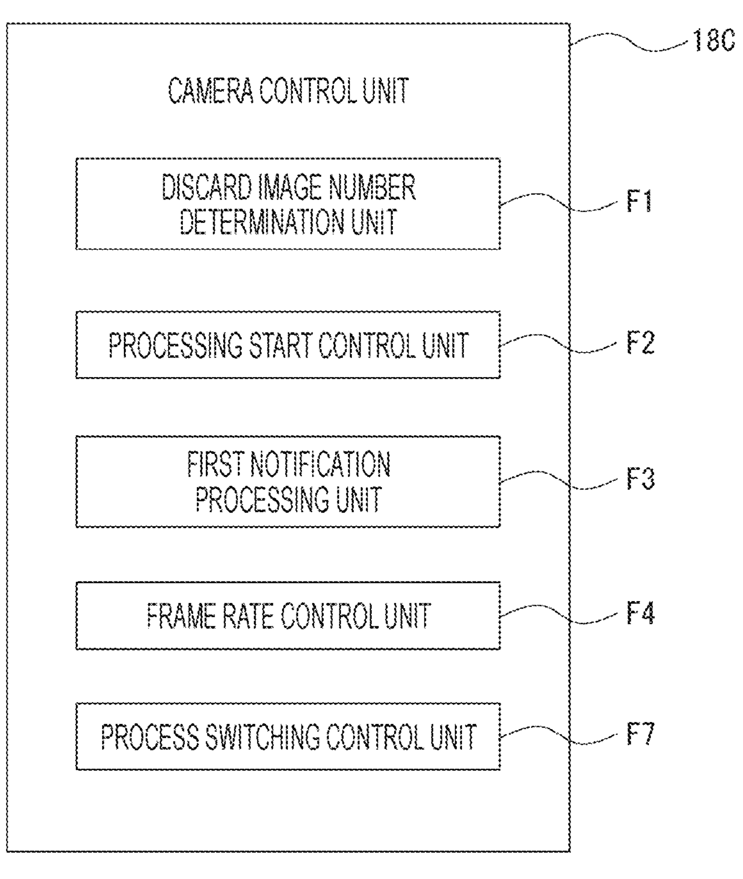
FIG. 18 is a functional block diagram for describing functions of an information processing device as a second example in the second embodiment.

FIG. 18 is a functional block diagram illustrating functions of a camera control unit 18 (hereinafter referred to as a "camera control unit 18C") included in an imaging device 1 as the second example in the second embodiment.

The camera control unit 18C has a function as a process switching control unit F7 as well as functions as the discard image number determination unit F1, the processing start control unit F2, the first notification processing unit F3, and the frame rate control unit F4.

The process switching control unit F7 performs control such that the following process is performed as the NR process on the continuously captured images at the time of continuous shooting. That is, an image obtained by executing the first NR process using the plurality of frame images before the continuous shooting start operation is output as an output image in the first frame period after the continuous shooting start operation, and an image obtained by executing the second NR process using the output image in the first frame period as the feedback image is output as an output image in the second frame period after the continuous shooting start operation. Then, an image obtained by executing the second NR process using the output image of the second NR process as the feedback image is output as an output image in each of the third or subsequent frame periods.

The NR process as the second example will be specifically described with reference to FIG. 19.

In the figure, a frame immediately after the continuous shooting start operation is illustrated as an "x−"th frame, frames before the "x−"th frame are illustrated as x−1, x−2, x−3, x−4, . . . , and frames after the "x−"th frame are illustrated as x+1, x+2, . . . .

First, in the present example, in the continuous shooting mode, buffering in the first memory 36 is started in response to satisfaction of an NR start condition such as the half-pressing operation of the shutter button 110S, for example. In the figure, the frame immediately after satisfaction of the NR start condition is the frame x−5, and thus, in this case, buffering from the frame x−5 in the first memory 36 is started (in the figure, the frame to be buffered is indicated by satin).

In a case where the continuous shooting start operation is performed after the NR start condition is satisfied, first, an NR image by the MFNR is output for the x-th frame as indicated by <1> in the figure. Here, as a premise that the MFNR process by the MFNR unit 35 is performed using four images, the NR image of the x-th frame is output using the images of from the frame x−3 to the frame x−1 buffered in the first memory 36 and the image of the frame x.

Here, in order to enable the operation of <1>, the terminal selection state of the first switch SW1 and the second switch SW2 in the camera signal processing unit 13C is the selection state illustrated in FIG. 17 described above. That is, the terminal t2 is selected in both the first switch SW1 and the second switch SW2.

In FIG. 19, in the (x+1)-th frame which is the second frame of the continuously captured images, as indicated by <2> in the figure, the NR image by the MCTF using the NR image of the x-th frame as the feedback image is output.

Therefore, in the third switch SW3 in this case, the terminal t2 is selected as illustrated in FIG. 20. Accordingly, in the (x+1)-th frame, the MCTF unit 32 can perform the MCTF process using the NR image by the MFNR unit 35 buffered in the second memory 37 as the feedback image.

Then, in the (x+2)th and subsequent frames that are the third and subsequent frames of the continuously captured images, switching to the NR process by the normal MCTF is performed as indicated by <3> in FIG. 19. That is, switching to the MCTF process using the MCTF-processed image as the feedback image is performed.

Figure 21:
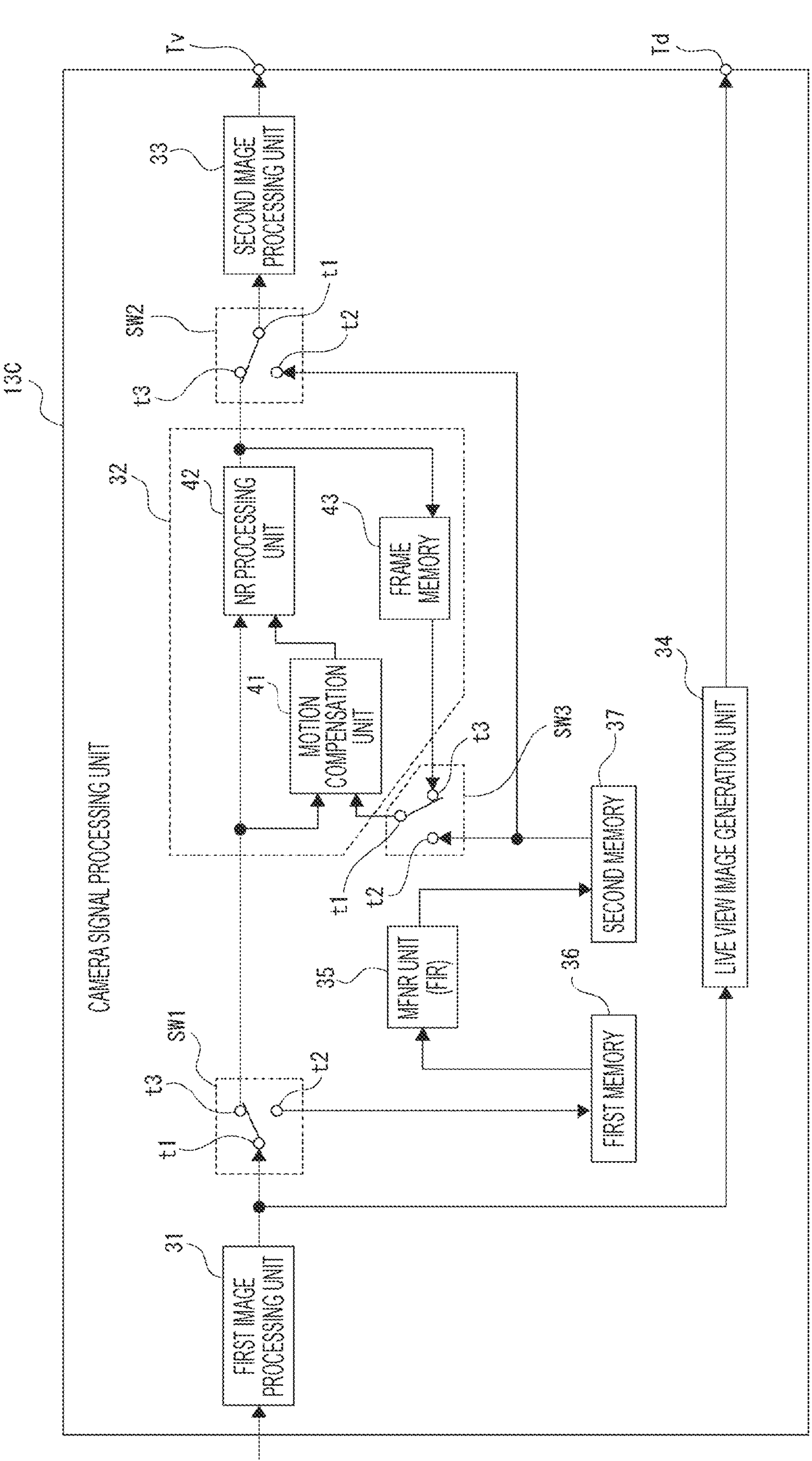
FIG. 21 is a diagram illustrating a control example of a switch included in an information processing device as a second example in the second embodiment together with FIG. 20.

For this reason, as the terminal selection states of the first switch SW1, the second switch SW2, and the third switch SW3 in this case, as illustrated in FIG. 21, the first switch SW1, the second switch SW2, and the third switch SW3 are each in a state of selecting the terminal t3.

By switching the NR process as described above, it is possible to obtain an image in which noise has been sufficiently reduced by the first NR process for the captured image of the first continuous shooting, and it is possible to obtain a high quality image for the captured images of the second and subsequent continuous shooting since the second NR process with motion compensation using the image in which noise has been reduced as the feedback image is also performed.

Therefore, it is possible to prevent continuously captured images for which noise reduction is not sufficiently performed from being obtained, and thus, it is possible to eliminate the need to discard the continuously captured images. In other words, it is possible to achieve both recording of continuously captured images with high image quality and prevention of occurrence of shutter lag at the time of continuous shooting.

Here, in the imaging device 1 of the present example, it is assumed that the user can select, as the NR process for the continuously captured images, a mode in which the NR process accompanying the switching from the first NR process to the second NR process as described above is performed (hereinafter referred to as a "combination mode") and a mode in which only the second NR process is performed without the switching (hereinafter referred to as a "non-combination mode").

When the combination mode is set, the NR process accompanied by the switching as described with reference to FIG. 19 is performed as the NR process on the continuously captured images in the continuous shooting mode. In a case where the non-combination mode is set, the NR process by the MCTF process is performed on from the first continuously captured image as the NR process of the continuously captured images in the continuous shooting mode.

Here, in the present example, in a case where the non-combination mode is set, in the continuous shooting mode, as in the processing illustrated in FIG. 7 above, the processes as the discard image number determination unit F1, the processing start control unit F2, the first notification processing unit F3, and the frame rate control unit F4 are performed.

Figure 22:
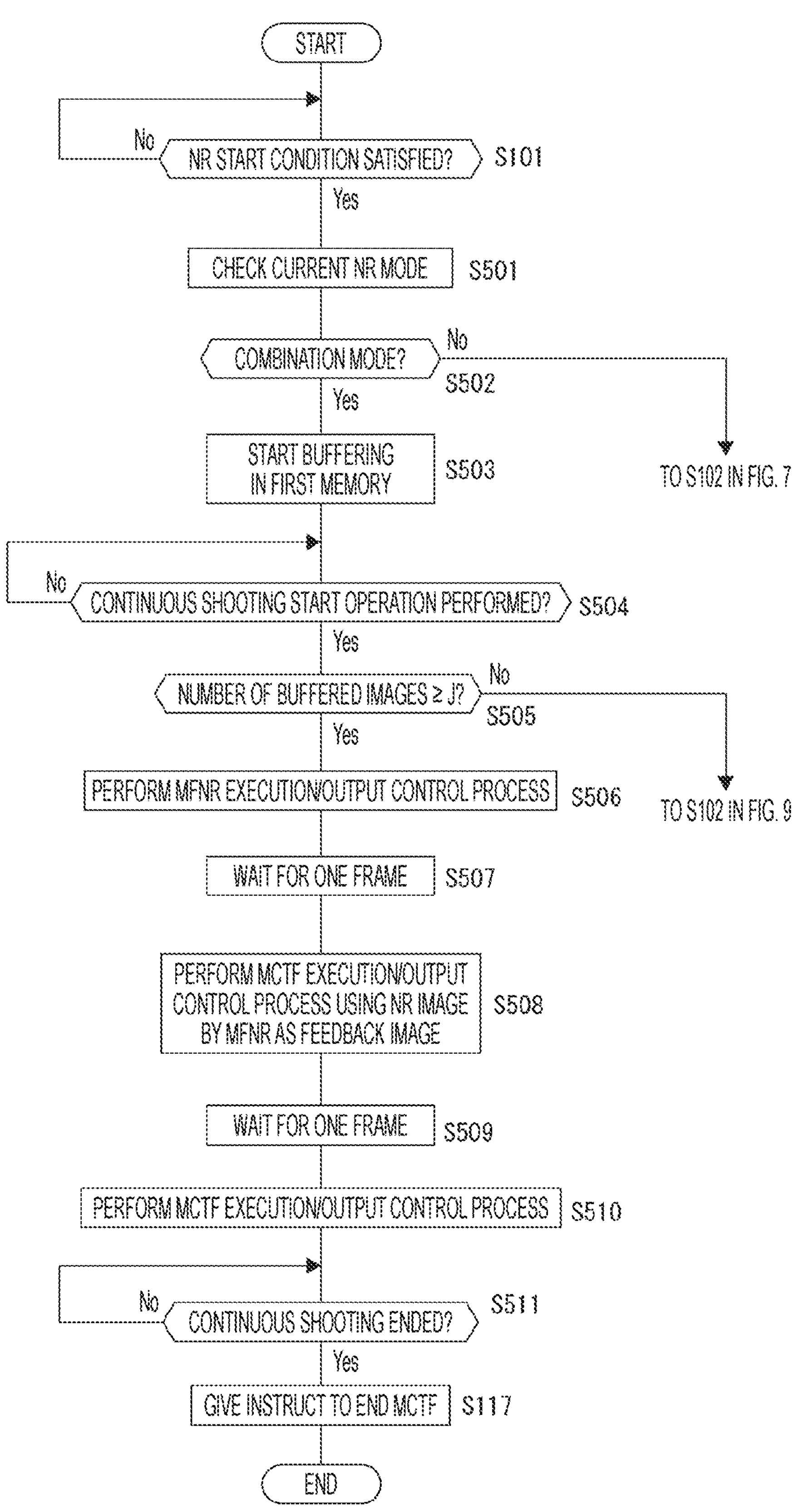
FIG. 22 is a flowchart illustrating a specific processing procedure example for realizing a function as a second example of the second embodiment.

FIG. 22 is a flowchart illustrating a specific processing procedure example for realizing the function as the second example of the second embodiment described above.

The processing illustrated in FIG. 22 is executed by the camera control unit 18C on the basis of a program stored in a storage device such as a ROM in the memory unit 19 in a setting state of the continuous shooting mode.

The camera control unit 18C first waits for the satisfaction of the NR start condition in step S101, and in a case where the NR start condition is satisfied, performs a process for confirming the current NR mode in step S501. That is, a mode checking process of determining which of the combination mode and the non-combination mode is set is performed.

In step S502 following step S501, the camera control unit 18C determines whether or not it is the combination mode. When the mode is not the combination mode, that is, the non-combination mode, the camera control unit 18C advances the process to step S102 illustrated in FIG. 7.

As a result, in the non-combination mode, the processes as the discard image number determination unit F1, the processing start control unit F2, the first notification processing unit F3, and the frame rate control unit F4 described above are performed.

On the other hand, in a case where it is determined in step S502 that the mode is the combination mode, the camera control unit 18C advances the process to step S503 and performs a process for starting buffering in the first memory 36. That is, after the first switch SW1 selects the terminal t2, buffering of the captured images from the first image processing unit 31 in the first memory 36 is started.

In step S504 following step S503, the camera control unit 18C waits for the continuous shooting start operation, and in a case where the continuous shooting start operation has been performed, it is determined in step S505 whether or not the number of buffered images, that is, the number of buffered images of the captured image in the first memory 36 is equal to or larger than a predetermined value J.

Here, the predetermined value J is a value indicating the required number of buffered images requested of the first memory 36 in a case where the MFNR unit 35 performs the NR process, and in this example, J=3, for example. Note that in a case where the x-th frame is buffered in the first memory 36, J=4.

In step S505, in a case where the number of buffered images is less than the predetermined value J, the camera control unit 18C advances the process to step S102 illustrated in FIG. 9.

As a result, for example, in a case where the interval from the satisfaction of the NR start condition to the continuous shooting start operation is short and the number of buffered images in the first memory 36 at the time of the continuous shooting start operation has not reached the number of images required for the MFNR process, the MCTF process is performed. At this time, in the MCTF start instruction in step S103 in FIG. 9, the terminal t3 is selected in each of the first switch SW1, the second switch SW2, and the third switch SW3.

On the other hand, in a case where it is determined in step S505 that the number of buffered images is equal to or larger than the predetermined value J, the camera control unit 18C advances the process to step S506 and executes the MFNR execution/output control process. That is, the MFNR unit 35 is caused to execute the MFNR process using the captured image of the frame x as the first continuous shooting and the captured images of from the frame x−3 to the frame x−4 buffered in the first memory 36. At this time, the second switch SW2 selects the terminal t2, so that the NR image by the MFNR unit 35 is output to the second image processing unit 33 via the second memory 37.

In step S507 following step S506, the camera control unit 18C performs a process of waiting for one frame, and in subsequent step S508, performs execution/output control of the MCTF using the NR image by the MFNR as the feedback image. That is, after the first switch SW1 selects the terminal t3 and the third switch SW3 selects the terminal t2, the NR image of the x-th frame buffered in the second memory 37 and the image of the frame x+1 as the second continuously captured image are input to the MCTF unit 32, and the MCTF unit 32 is caused to execute the MCTF process using the NR image of the x-th frame and the image of the (x+1)-th frame. At this time, the second switch SW2 selects the terminal t3, and the NR image by the MCTF unit 32 is output to the second image processing unit 33.

In step S509 following step S508, the camera control unit 18C performs a process of waiting for one frame, and in subsequent step S510, performs MCTF execution/output start control. That is, a process of causing the third switch SW3 to select the terminal t3 is performed. As a result, the MCTF unit 32 starts the MCTF process using the NR image one frame before as the feedback image for the (x+2)th and subsequent continuously captured images, that is, the third and subsequent continuously captured images.

In step S511 following step S510, the camera control unit 18C waits for the end of continuous shooting, and in a case where the continuous shooting ends, instructs to end the MCTF in step S117, and ends the series of processing illustrated in FIG. 22.

3. Modifications

Here, embodiments are not limited to the specific examples described so far, and configurations as various variations can be used.

Figure 23:
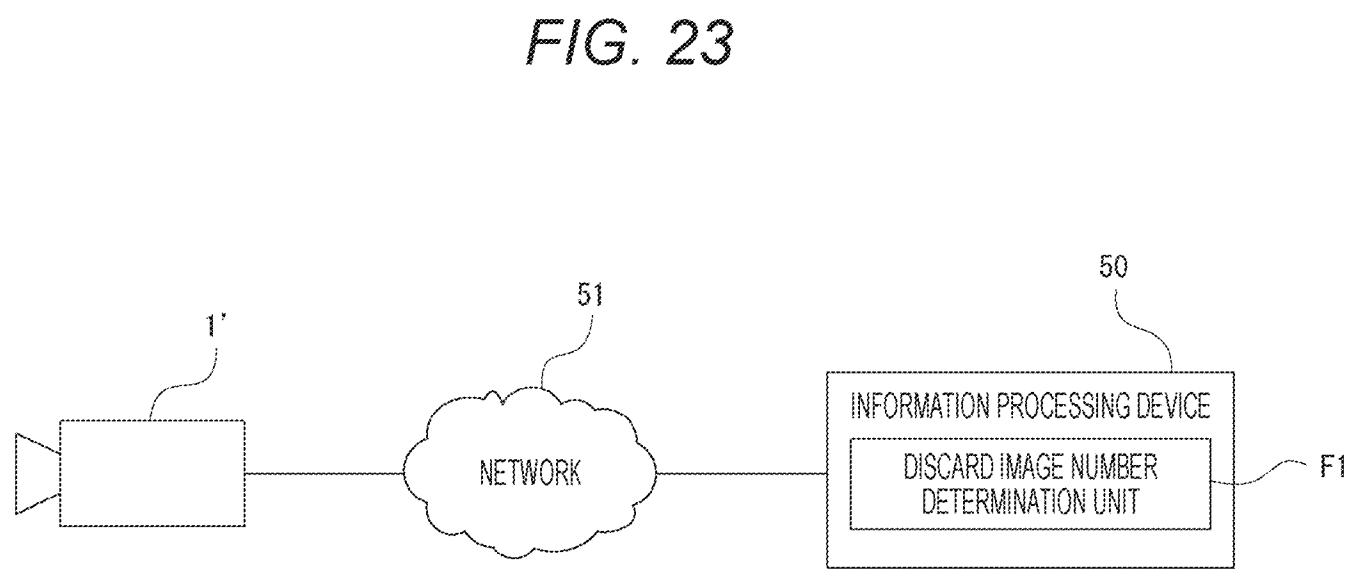

For example, in the above description, while an example is described in which the process of the discard image number determination unit F1 as the embodiment is executed in the imaging device 1 (that is, a case where the information processing device according to the present technology is the imaging device 1 has been illustrated), as illustrated in FIG. 23, for example, it is also conceivable to provide the discard image number determination unit F1 in an information processing device 50 different from the imaging device 1' that performs continuous shooting.

Here, as an example, the information processing device 50 is configured as a server device such as a cloud server that can communicate with the imaging device 1' via a network 51. Such a system form may be, for example, a form in which the imaging device 1' is a monitoring camera or the like connected to the network 51, and the information processing device 50 controls the operation of the imaging device 1' via the network 51.

Note that, here, only the discard image number determination unit F1 is provided in the information processing device 50, but some or all of the processing start control unit F2, the first notification processing unit F3, the frame rate control unit F4, the second notification processing unit F5, the mode switching control unit F6, and the process switching control unit F7 may be provided in the information processing device 50.

Furthermore, in the above description, while an example is described in which the switching control of the NR process described in the second embodiment (switching control by the mode switching control unit F6 and the process switching control unit F7) is performed in the imaging device 1 having the function of determining the number of discard images N in accordance with the imaging setting, the switching control may be performed in the imaging device 1 (or the information processing device 50) not having the function of determining the number of discard images N.

Furthermore, in the above description, the three-dimensional noise reduction process has been exemplified as an example of the MCTF process, but the present technology can also be suitably applied to a case where another MCTF process other than the three-dimensional noise reduction process is performed.

4. Program

Although the information processing device (the imaging device 1 or the information processing device 50) as the embodiment is described above, the program of the embodiment is a program that causes a computer device such as a CPU to execute processing by the information processing device as the embodiment.

The program according to an embodiment is a program readable by a computer device, the program causing the computer device to implement a function of, in a case where a motion compensated temporal filtering process is performed on continuously captured images that are images captured by a continuous shooting function of an imaging device, determining the number of discard images that is the number of images to be discarded among the continuously captured images on which the motion compensated temporal filtering process was performed in accordance with an imaging setting of the imaging device.

That is, this program corresponds to, for example, a program for causing the computer device to execute the processing described in FIGS. 7, 9, 12, 16, 22, and the like.

Such a program can be stored in advance in a storage medium readable by the computer device, for example, a ROM, a hard disk drive (HDD), a solid state drive (SSD), or the like.

Alternatively, the program can be temporarily or permanently stored in a removable storage medium such as a semiconductor memory, a memory card, an optical disk, a magneto-optical disk, and a magnetic disk. Such a removable storage medium can be provided as so-called package software.

Furthermore, such program can be installed from the removable storage medium into a personal computer and the like, or can be downloaded from a download site via a network such as a LAN or the Interne to a required information processing device such as a smartphone.

5. Summary of Embodiments

As described above, the information processing device (the imaging device 1 or the information processing device 50) as the embodiment includes the discard image number determination unit (F1) that determines, in a case where the motion compensated temporal filtering process is performed on the continuously captured images that are images captured by a continuous shooting function of an imaging device, the number of discard images that is the number of images to be discarded among the continuously captured images on which the motion compensated temporal filtering process is performed in accordance with the imaging settings of the imaging device.

According to the above configuration, it is possible to adaptively change the number of discard images of the continuously captured images in accordance with the setting related to imaging in the imaging device, such as settings of ISO sensitivity or various imaging modes by the user.

Therefore, it is possible to prevent the number of discard images from increasing or decreasing in vain, and it is possible to optimize the balance between the suppression of the shutter lag in continuous shooting and the improvement in image quality of the continuously captured images by the motion compensated temporal filtering process.

Furthermore, in the information processing device as the embodiment, the motion compensated temporal filtering process is a three-dimensional noise reduction process.

As a result, it is possible to optimize the balance between the suppression of the shutter lag in continuous shooting and the improvement of the noise reduction performance of the continuously captured images.

Furthermore, in the information processing device as the embodiment, the discard image number determination unit determines the number of discard images on the basis of the setting of the ISO sensitivity in the imaging device.

As a result, it is possible to determine the number of discard images in accordance with the ISO sensitivity setting, for example, in a case where the ISO sensitivity is high and it is predicted that the degradation of the image quality of the continuously captured images is likely to occur, the number of discard images is increased to give priority to the image quality, and conversely, in a case where the ISO sensitivity is low and it is predicted that the degradation of the image quality of the continuously captured images is unlikely to occur, the number of discard images is decreased to give priority to the suppression of the shutter lag.

Therefore, the suppression of the shutter lag in continuous shooting and the improvement in image quality of the continuously captured images by the motion compensated temporal filtering process can be appropriately balanced according to the degree of image quality degradation predicted from the ISO sensitivity.

Furthermore, in the information processing device as the embodiment, the discard image number determination unit determines the number of discard images so as to have a positive correlation with the ISO sensitivity.

As a result, in a case where the ISO sensitivity is high and it is predicted that the degradation of the image quality of the continuously captured images is likely to occur, it is possible to prioritize the image quality by increasing the number of discard images, and conversely, in a case where the ISO sensitivity is low and it is predicted that the degradation of the image quality of the continuously captured images is unlikely to occur, it is possible to prioritize the suppression of the shutter lag by decreasing the number of discard images.

Therefore, the suppression of the shutter lag in continuous shooting and the improvement in image quality of the continuously captured images by the motion compensated temporal filtering process can be appropriately balanced according to the degree of image quality degradation predicted from the ISO sensitivity.

Furthermore, in the information processing device as the embodiment, the discard image number determination unit determines the number of discard images according to which imaging mode among a plurality of imaging modes with which different numbers of discard images are associated is set in the imaging device.

As a result, it is possible to determine the appropriate number of discard images according to the imaging mode being set.

Therefore, it is possible to optimize the balance between the suppression of the shutter lag in the continuous shooting and the improvement in image quality of the continuously captured images.

Furthermore, in the information processing device as the embodiment, the discard image number determination unit changes the number of discard images according to which of the automatic imaging mode and the program automatic imaging mode is set.

It can be assumed that the user who intentionally sets the program automatic imaging mode instead of the automatic imaging mode is conscious of the shutter timing, and it is estimated that the user desires to suppress the shutter lag at the time of continuous shooting, so that it is conceivable to reduce the number of discard images. Conversely, it can be assumed that the user who intentionally sets the program automatic imaging mode instead of the automatic imaging mode is conscious of the image quality of the captured image, and in this case, it is conceivable to increase the number of discard images. According to the above configuration, it is possible to adaptively change the number of discard images between a case where the automatic imaging mode is set and a case where the program automatic imaging mode is set according to these cases.

Therefore, it is possible to appropriately balance the suppression of the shutter lag in the continuous shooting and the improvement in image quality of the continuously captured images according to the user's intention estimated from the imaging mode setting.

Furthermore, the information processing device as the embodiment includes the processing start control unit (F2) configured to perform control of starting the motion compensated temporal filtering process in response to satisfaction of a predetermined condition regarding imaging before continuous shooting starts by the continuous shooting function.

This makes it possible to start the motion compensated temporal filtering process before continuous shooting starts.

Therefore, at the start of continuous shooting, the image quality improvement effect by the motion compensated temporal filtering process can be converged to some extent or completely converged, and the number of discard images can be reduced.

Furthermore, in the information processing device as the embodiment, the processing start control unit starts the motion compensated temporal filtering process on condition that an operation related to designation of a focus is performed in the imaging device.

In a case where continuous shooting is performed, it is assumed that an operation related to designation of a focus such as a half-pressing operation of a shutter button or an autofocus lock operation is performed before continuous shooting starts.

Therefore, according to the above configuration, the motion compensated temporal filtering process can be started before continuous shooting starts, and the number of discard images can be reduced.

Furthermore, in the information processing device as the embodiment, the processing start control unit starts the motion compensated temporal filtering process on condition that a half-pressing operation of a shutter button or a touch focus operation is performed in the imaging device.

In a case where continuous shooting is performed, it is assumed that the half-pressing operation of the shutter button or the touch focus operation is performed before continuous shooting starts.

Therefore, according to the above configuration, the motion compensated temporal filtering process can be started before continuous shooting starts, and the number of discard images can be reduced.

Furthermore, in the information processing device as the embodiment, the processing start control unit starts the motion compensated temporal filtering process on condition that the autofocus lock operation is performed in the imaging device.

In a case where continuous shooting is performed, it is assumed that the autofocus lock operation is performed before continuous shooting starts.

Therefore, according to the above configuration, the motion compensated temporal filtering process can be started before continuous shooting starts, and the number of discard images can be reduced.

Furthermore, in the information processing device as the embodiment, the processing start control unit starts the motion compensated temporal filtering process on condition that the operation related to designation of the exposure is performed in the imaging device.

In a case where continuous shooting is performed, it is assumed that, for example, an operation related to exposure designation such as a touch AE operation or an AE lock operation is performed before continuous shooting starts.

Therefore, according to the above configuration, the motion compensated temporal filtering process can be started before continuous shooting starts, and the number of discard images can be reduced.

Furthermore, in the information processing device as the embodiment, the imaging device is configured to be capable of detecting attachment and detachment of the imaging device to and from the support, and the processing start control unit starts the motion compensated temporal filtering process on condition that the imaging device is mounted on the support.

In the case of performing continuous shooting, it is assumed that, for example, the imaging device is mounted on the support such as a tripod before continuous shooting starts.

Therefore, according to the above configuration, the motion compensated temporal filtering process can be started before continuous shooting starts, and the number of discard images can be reduced.

Furthermore, in a case where continuous shooting is performed in a state where the imaging device is fixedly supported by the support, the image quality improvement effect by the MCTF can be easily obtained. In this respect, as described above, it is preferable to start the motion compensated temporal filtering process according to the mounting to the support.

Furthermore, the information processing device as the embodiment includes the first notification processing unit (F3) configured to perform control such that the user is notified of the timing at which the number of processed images matches the number of discard images on the basis of the number of processed images that is the number of captured images on which the motion compensated temporal filtering process is performed, and the number of discard images determined by the discard image number determination unit after the motion compensated temporal filtering process is started under the control of the processing start control unit.

As a result, it is possible to notify the user of the timing at which the captured images by the number of discard images are processed by the motion compensated temporal filtering process started before the start of continuous shooting, that is, the timing at which the number of discard images is zero.

Therefore, it is possible to prompt the user to start continuous shooting at the timing when the number of discard images is zero, and it is possible to prevent occurrence of shutter lag in continuous shooting.

Furthermore, the information processing device as the embodiment includes the frame rate control unit (F4) configured to perform control of reducing the processing frame rate of the live view image generation unit configured to generate a live view image in response to the processing start control unit starting the motion compensated temporal filtering process.

As a result, it is possible to suppress an increase in power consumption of the imaging device in a case where the motion compensated temporal filtering process is started before continuous shooting starts.

Furthermore, the information processing device as the embodiment includes the second notification processing unit (F5) configured to perform control such that a notification in response to the shutter speed being equal to or lower than a predetermined speed is given to the user in a case where the continuous shooting mode that is a mode in which continuous shooting by the continuous shooting function is performed in accordance with the release operation is set in the imaging device.

In the continuous shooting mode, in a case where the shutter speed is slow, that is, in a case where the continuous shooting speed is slow, the shutter lag associated with image discard increases. Therefore, in a case where the shutter speed is equal to or lower than the predetermined speed as described above, the user is notified of the fact.

Therefore, it is possible to notify the user of the fact that the shutter lag associated with the image discard is large, and it is possible to alleviate the uncomfortable feeling of the user as compared with the case where the shutter lag occurs without notification.

Furthermore, in the information processing device as the embodiment, the imaging device is configured to be capable of executing, as a process on the continuously captured images, a first NR process that is a noise reduction process by an FIR filter and a second NR process that is a noise reduction process by the motion compensated temporal filtering process, and includes the mode switching control unit (F6) configured to perform mode switching control between a first NR mode that is a mode for applying the first NR process to the continuously captured images and a second NR mode that is a mode for applying the second NR process to the continuously captured images.

As a result, for example, it is possible to optimize the balance between the suppression of the shutter lag and the improvement in image quality by switching between the first and second NR modes in which the first NR process in which the shutter lag does not occur is performed in a case where it is predicted that the shutter lag associated with the image discard increase in terms of the shutter speed at the time of continuous shooting, and conversely, in a case where it is predicted that the shutter lag associated with the image discard decrease in terms of the shutter speed, the second NR process with motion compensation is performed to improve image quality.

Furthermore, in the information processing device as the embodiment, the mode switching control unit performs the mode switching control on the basis of setting information related to designation of a shutter speed at the time of continuous shooting.

For example, it is possible to estimate which of the suppression of the shutter lag and the improvement in image quality is to be prioritized on the basis of the "setting information related to designation of the shutter speed at the time of continuous shooting" such as the setting information about the continuous shooting speed and whether or not the shutter speed priority mode is set.

Therefore, according to the above configuration, it is possible to optimize the balance between the suppression of the shutter lag and the improvement in image quality by switching between the first and second NR modes.

Furthermore, in the information processing device as the embodiment, the imaging device is configured to be capable of executing, as a process on the continuously captured images, a first NR process that is a noise reduction process by an FIR filter and a second NR process that is a noise reduction process by the motion compensated temporal filtering process, and includes the process switching control unit (F7) configured to perform control of outputting an image obtained by executing the first NR process using a plurality of frame images before a continuous shooting start operation as an output image in a first frame period after the continuous shooting start operation, outputting an image obtained by executing the second NR process using an output image in the first frame period as a feedback image as an output image in a second frame period after the continuous shooting start operation, and outputting an image obtained by executing the second NR process using an output image in the second NR process as a feedback image as an output image in a third or subsequent frame period.

As a result, it is possible to obtain an image in which noise is sufficiently reduced by the first NR process for the captured image of the first continuous shooting, and it is also possible to obtain a high quality image since the second NR process with motion compensation using an image in which noise has been reduced as a feedback image is performed for the captured image of each of the second and subsequent continuous shooting.

Therefore, it is possible to prevent continuously captured images for which noise reduction is not sufficiently performed from being obtained, and thus, it is possible to eliminate the need to discard the continuously captured images. In other words, it is possible to achieve both recording of continuously captured images with high image quality and prevention of occurrence of shutter lag at the time of continuous shooting.

Furthermore, an information processing method as the embodiment is an information processing method including an information processing device determining, in a case where a motion compensated temporal filtering process is performed on continuously captured images that are images captured by a continuous shooting function of an imaging device, the number of discard images that is the number of images to be discarded among the continuously captured images on which the motion compensated temporal filtering process was performed in accordance with an imaging setting of the imaging device.

Such an information processing method can produce functions and effects similar to the functions and effects produced by the information processing device as the embodiment described above.

Furthermore, a program as the embodiment is a program readable by a computer device, the program causing the computer device to implement a function of determining, in a case where a motion compensated temporal filtering process is performed on continuously captured images that are images captured by a continuous shooting function of an imaging device, the number of discard images that is the number of images to be discarded among the continuously captured images on which the motion compensated temporal filtering process was performed in accordance with an imaging setting of the imaging device.

With such a program, the computer device can function as the information processing device as the above-described embodiment.

Note that the effects described in the present description are merely examples and are not limited, and other effects may be provided.

6. Present Technology

Note that the present technology can also have the following configurations.

(1)

An information processing device including a discard image number determination unit configured to determine, in a case where a motion compensated temporal filtering process is performed on continuously captured images that are images captured by a continuous shooting function of an imaging device, the number of discard images that is the number of images to be discarded among the continuously captured images on which the motion compensated temporal filtering process was performed in accordance with an imaging setting of the imaging device.

(2)

The information processing device according to Item (1), in which the motion compensated temporal filtering process includes a three-dimensional noise reduction process.

(3)

The information processing device according to Item (1) or (2), in which the discard image number determination unit determines the number of discard images on the basis of a setting of ISO sensitivity in the imaging device.

(4)

The information processing device according to Item (3), in which the discard image number determination unit determines the number of discard images so as to have a positive correlation with the ISO sensitivity.

(5)

The information processing device according to any one of Items (1) to (4), in which the discard image number determination unit determines the number of discard images according to which imaging mode is set among a plurality of imaging modes with which different numbers of discard images are associated in the imaging device.

(6)

The information processing device according to any one of Items (1) to (5), in which the discard image number determination unit changes the number of discard images according to which imaging mode of an automatic imaging mode or a program automatic imaging mode is set.

(7)

The information processing device according to any one of Items (1) to (6), further including a processing start control unit configured to perform control of starting the motion compensated temporal filtering process in response to satisfaction of a predetermined condition regarding imaging before continuous shooting starts by the continuous shooting function.

(8)

The information processing device according to Item (7), in which the processing start control unit starts the motion compensated temporal filtering process on condition that an operation related to designation of a focus is performed in the imaging device.

(9)

The information processing device according to any one of Items (7) to (8), in which the processing start control unit starts the motion compensated temporal filtering process on condition that a half-pressing operation of a shutter button or a touch focus operation is performed in the imaging device.

(10)

The information processing device according to any one of Items (7) to (9), in which the processing start control unit starts the motion compensated temporal filtering process on condition that an autofocus lock operation is performed in the imaging device.

(11)

The information processing device according to any one of Items (7) to (10), in which the processing start control unit starts the motion compensated temporal filtering process on condition that an operation related to designation of exposure is performed in the imaging device.

(12)

The information processing device according to any one of Items (7) to (10), in which the imaging device is configured to be capable of detecting attachment and detachment of the imaging device to and from a support, and the processing start control unit starts the motion compensated temporal filtering process on condition that the imaging device is mounted on the support.

(13)

The information processing device according to any one of Items (7) to (12), further including a first notification processing unit configured to perform control such that a user is notified of a timing at which the number of processed images matches the number of discard images on the basis of the number of processed images that is the number of captured images on which the motion compensated temporal filtering process is performed and the number of discard images determined by the discard image number determination unit after the motion compensated temporal filtering process is started under control of the processing start control unit.

(14)

The information processing device according to any one of Items (7) to (13), further including a frame rate control unit configured to perform control of reducing a processing frame rate of a live view image generation unit configured to generate a live view image in response to the processing start control unit starting the motion compensated temporal filtering process.

(15)

The information processing device according to any one of Items (1) to (14), further including a second notification processing unit configured to perform control such that a notification indicating that a shutter speed is equal to or lower than a predetermined speed is given to a user in a case where a continuous shooting mode that is a mode in which continuous shooting by the continuous shooting function is performed in accordance with a release operation is set in the imaging device.

(16)

The information processing device according to any one of Items (2) to (15), in which the imaging device is configured to be capable of executing, as a process on the continuously captured images, a first NR process that is a noise reduction process by an FIR filter and a second NR process that is a noise reduction process by the motion compensated temporal filtering process, and includes a mode switching control unit configured to perform mode switching control between a first NR mode that is a mode in which the first NR process is performed on the continuously captured images and a second NR mode that is a mode in which the second NR process is performed on the continuously captured images.

(17)

The information processing device according to Item (16), in which the mode switching control unit performs the mode switching control on the basis of setting information related to designation of a shutter speed at a time of continuous shooting.

(18)

The information processing device according to any one of Items (2) to (15), in which the imaging device is configured to be capable of executing, as a process on the continuously captured images, a first NR process that is a noise reduction process by an FIR filter and a second NR process that is a noise reduction process by the motion compensated temporal filtering process, and includes a process switching control unit configured to perform control of outputting an image obtained by executing the first NR process using a plurality of frame images before a continuous shooting start operation as an output image in a first frame period after the continuous shooting start operation, outputting an image obtained by executing the second NR process using an output image in the first frame period as a feedback image as an output image in a second frame period after the continuous shooting start operation, and outputting an image obtained by executing the second NR process using an output image in the second NR process as a feedback image as an output image in a third or subsequent frame period.

(19)

An information processing method including, by an information processing device, determining, in a case where a motion compensated temporal filtering process is performed on continuously captured images that are images captured by a continuous shooting function of an imaging device, the number of discard images that is the number of images to be discarded among the continuously captured images on which the motion compensated temporal filtering process was performed in accordance with an imaging setting of the imaging device.

(20)

A program readable by a computer device, the program causing the computer device to implement a function of determining, in a case where a motion compensated temporal filtering process is performed on continuously captured images that are images captured by a continuous shooting function of an imaging device, the number of discard images that is the number of images to be discarded among the continuously captured images on which the motion compensated temporal filtering process was performed in accordance with an imaging setting of the imaging device.

REFERENCE SIGNS LIST

1, 1' Imaging device
12 Imaging element unit
**12*a*** Imaging element

13, 13B, 13C Camera signal processing unit
14 Recording control unit
15 Display unit
17 Operation unit
18, 18A, 18B, 18C Camera control unit
19 memory unit
25 Accessory attachment/detachment detection unit
Tv Video terminal
Td Display terminal
31 First image processing unit
32 MCTF unit
33 Second image processing unit
34 Live view image generation unit
41 Motion compensation unit
42 NR processing unit
43 Frame memory
F1 Discard image number determination unit
F2 Processing start control unit
F3 First notification processing unit
F4 Frame rate control unit
F5 Second notification processing unit
If Focus frame
Id Drive mode information
I1 First notification information
I2 Second notification information
F6 Mode switching control unit
F7 Process switching control unit
35 MFNR unit
36 First memory
37 Second memory
SW1 First switch
SW2 Second switch
SW3 Third switch
50 Information processing device
51 Network
101 Display panel
110 Operator
110S Shutter button
110E AE lock button
110F AF lock button

The invention claimed is:

1. An information processing device, comprising:
a central processing unit (CPU) configured to:
determine, in a motion compensated temporal filtering process on a plurality of continuously captured images, a number of discard images based on an imaging setting of an imaging device, wherein
the plurality of continuously captured images is captured by a continuous shooting function of the imaging device, and
the discard images comprise images to be discarded among the plurality of continuously captured images.

2. The information processing device according to claim 1, wherein the motion compensated temporal filtering process includes a three-dimensional noise reduction process.

3. The information processing device according to claim 2, wherein
the imaging device executes, as a process on the plurality of continuously captured images, a first NR process that is a noise reduction process by an FIR filter and a second NR process that is a noise reduction process by the motion compensated temporal filtering process,
the CPU is further configured to perform mode switching control between a first NR mode and a second NR mode,
the first NR process, in the first NR mode, processes the plurality of continuously captured images, and
the second NR process, in the second NR mode, processes the plurality of continuously captured images.

4. The information processing device according to claim 3, wherein
the CPU is further configured to perform the mode switching control based on setting information associated with designation of a shutter speed at a time of a continuous shooting operation in the continuous shooting function.

5. The information processing device according to claim 2, wherein
the imaging device executes, as a process on the plurality of continuously captured images, a first NR process that is a noise reduction process by an FIR filter and a second NR process that is a noise reduction process by the motion compensated temporal filtering process, and
the CPU is further configured to control:
output of an image obtained by the first NR process using a plurality of frame images before a continuous shooting start operation as an output image in a first frame period after the continuous shooting start operation,
output of an image obtained by the second NR process using an output image in the first frame period as a feedback image as an output image in a second frame period after the continuous shooting start operation, and
output of an image obtained by the second NR process using an output image in the second NR process as a feedback image as an output image in one of a third frame period or a subsequent frame period.

6. The information processing device according to claim 1, wherein the CPU is further configured to determine the number of the discard images based on a setting of ISO sensitivity in the imaging device.

7. The information processing device according to claim 6, wherein the CPU is further configured to determine the number of the discard images so as to have a positive correlation with the ISO sensitivity.

8. The information processing device according to claim 1, wherein
the CPU is further configured to determine the number of the discard images based on an imaging mode among a plurality of imaging modes of the imaging device, and
each imaging mode of the plurality of imaging modes is associated with a different number of the discard images.

9. The information processing device according to claim 1, wherein
the CPU is further configured to change the number of the discard images based on an imaging mode of the imaging device, and
the imaging mode is one of an automatic imaging mode or a program automatic imaging mode.

10. The information processing device according to claim 1, wherein
the CPU is further configured to start the motion compensated temporal filtering process, based on satisfaction of a condition regarding an imaging operation prior to a continuous shooting operation by the continuous shooting function.

11. The information processing device according to claim 10, wherein the condition is an operation to designate a focus in the imaging device.

12. The information processing device according to claim 10, wherein the condition is one of a half-pressing operation of a shutter button or a touch focus operation in the imaging device.

13. The information processing device according to claim 10, wherein the condition is an autofocus lock operation in the imaging device.

14. The information processing device according to claim 10, wherein the condition is an operation to designate of exposure in the imaging device.

15. The information processing device according to claim 10, wherein the CPU is further configured to:

determine that the imaging device is on a support; and start the motion compensated temporal filtering process based on the determination that the imaging device is on the support.

16. The information processing device according to claim 10, wherein a specific number of processed images is obtained by the motion compensated temporal filtering process on the specific number of captured images, the CPU is further configured to notify a user of a timing at which the specific number of the processed images matches the specific number of the discard images, and the determination of the number of the discard images is subsequent to the start of the motion compensated temporal filtering process.

17. The information processing device according to claim 10, wherein the CPU is further configured to reduce a processing frame rate of a live view image, based on the start of the motion compensated temporal filtering process.

18. The information processing device according to claim 1, wherein the CPU is further configured to notify a user that a shutter speed is equal to or lower than a specific speed, based on a continuous shooting mode, and perform, in the continuous shooting mode, a continuous shooting operation by the continuous shooting function based on a release operation in the imaging device.

19. An information processing method, comprising:

determining, in a motion compensated temporal filtering process on a plurality of continuously captured images, a number of discard images based on an imaging setting of an imaging device, wherein the plurality of continuously captured images is captured by a continuous shooting function of the imaging device, and the discard images comprise images to be discarded among the plurality of continuously captured images.

20. A non-transitory computer-readable medium having stored thereon, computer-executable instructions which, when executed by a computer, cause the computer to execute operations, the operations comprising:

determining, in a motion compensated temporal filtering process on a plurality of continuously captured images, a number of discard images based on an imaging setting of an imaging device, wherein the plurality of continuously captured images is captured by a continuous shooting function of the imaging device, and the discard images comprise images to be discarded among the plurality of continuously captured images.

* * * * *